US012770298B2

(12) United States Patent
Zhang

(10) Patent No.: US 12,770,298 B2
(45) Date of Patent: Oct. 20, 2026

(54) TEXT EMBEDDING ADAPTER

(71) Applicant: ADOBE INC., San Jose, CA (US)

(72) Inventor: Jianming Zhang, Fremont, CA (US)

(73) Assignee: ADOBE INC., San Jose, CA (US)

( * ) Notice: Subject to any disclaimer, the term of this patent is extended or adjusted under 35 U.S.C. 154(b) by 155 days.

(21) Appl. No.: 18/507,735

(22) Filed: Nov. 13, 2023

(65) Prior Publication Data

US 2025/0005807 A1 Jan. 2, 2025

Related U.S. Application Data

(60) Provisional application No. 63/511,021, filed on Jun. 29, 2023.

(51) Int. Cl.

| | |
|---|---|
| ***G06T 11/00*** | (2026.01) |
| ***G06F 40/40*** | (2020.01) |
| ***G06N 20/00*** | (2019.01) |
| ***G06T 5/70*** | (2024.01) |

(52) U.S. Cl.

CPC .............. *G06T 11/00* (2013.01); *G06F 40/40* (2020.01); *G06N 20/00* (2019.01); *G06T 5/70* (2024.01); *G06T 2207/20081* (2013.01); *G06T 2207/20084* (2013.01)

(58) Field of Classification Search

CPC ........ G06F 40/40; G06N 20/00; G06N 3/045; G06N 3/047; G06N 3/08; G06T 11/00; G06T 2207/20081; G06T 2207/20084; G06T 5/70

See application file for complete search history.

(56) References Cited

U.S. PATENT DOCUMENTS

| | | | | |
|---|---|---|---|---|
| 11,908,180 | B1 * | 2/2024 | Ho | G06V 10/82 |
| 2020/0151508 | A1 * | 5/2020 | Yang | G06V 10/82 |
| 2023/0281999 | A1 * | 9/2023 | Schulter | G06V 20/70 382/159 |
| 2023/0377226 | A1 * | 11/2023 | Saharia | G06V 10/82 |
| 2024/0070868 | A1 * | 2/2024 | Yu | G06T 7/11 |
| 2024/0295953 | A1 * | 9/2024 | Zakharov | G06T 11/00 |

OTHER PUBLICATIONS

Rombach, et al., "High-Resolution Image Synthesis with Latent Diffusion Models", in Proceedings of the IEEE/CVF conference on computer vision and pattern recognition (pp. 10684-10695), (2022).

(Continued)

*Primary Examiner* — Xiao M Wu

(74) *Attorney, Agent, or Firm* — F. CHAU & ASSOCIATES, LLC

(57) ABSTRACT

A method, apparatus, non-transitory computer readable medium, and system for image processing include obtaining a text prompt. A text encoder encodes the text prompt to obtain a preliminary text embedding. An adaptor network generates an adapted text embedding based on the preliminary text embedding. In some cases, the adaptor network is trained to adapt the preliminary text embedding for generating an input to an image generation model. The image generation model generates a synthetic image based on the adapted text embedding. In some cases, the synthetic image includes content described by the text prompt.

20 Claims, 11 Drawing Sheets

(56) References Cited

OTHER PUBLICATIONS

Ramesh, et al., "Hierarchical Text-Conditional Image Generation with CLIP Latents", arXiv preprint arXiv:2204.06125v1 [cs.CV] Apr. 13, 2022, 1(2), 3.
Raffel, et al., "Exploring the Limits of Transfer Learning with a Unified Text-to-Text Transformer", arXiv preprint arXiv:1910.10683v4 [cs.LG] Sep. 19, 2023, 67 pages.
Website Source: https://imagen.research.google/.

* cited by examiner

TEXT EMBEDDING ADAPTER

CROSS-REFERENCE TO RELATED APPLICATION

This application claims priority under 35 U.S.C. § 119 to U.S. Provisional Application No. 63/511,021, filed on Jun. 29, 2023, in the United States Patent and Trademark Office, the disclosure of which is incorporated by reference herein in its entirety.

BACKGROUND

The following relates generally to image processing, and more specifically to image generation. Image processing refers to the use of a computer to edit an image using an algorithm or a processing network. Image processing software can be used for various image processing tasks, such as image editing, image restoration, image detection, and image generation. For example, image generation includes the use of a machine learning model to generate an image based on a dataset. In some cases, the machine learning model is trained to generate images based on a text, a color, a style, or a reference image.

SUMMARY

Aspects of the present disclosure provide methods, non-transitory computer readable media, apparatuses, and systems for image generation. According to an aspect of the present disclosure, an image generation model is trained to generate a synthetic image based on a prompt (e.g., a text prompt). In some cases, embodiments of the present disclosure include a text encoder that encodes the text prompt to generate a preliminary text embedding. Embodiments of the present disclosure include an adaptor network that generates an adapted text embedding based on the preliminary text embedding. For example, the adaptor network can be used to augment the text encoder. The image generation model generates a synthetic image based on the adapted text embedding. By using the adaptor network, the image generation model is able to accurately generate a synthetic image that includes content described by the text prompt.

A method, apparatus, non-transitory computer readable medium, and system for image processing are described. One or more aspects of the method, apparatus, non-transitory computer readable medium, and system include obtaining a text prompt; encoding, using a text encoder, the text prompt to obtain a preliminary text embedding; generating, using an adaptor network, an adapted text embedding based on the preliminary text embedding, wherein the adaptor network is trained to adapt the preliminary text embedding for generating an input to an image generation model; and generating, using the image generation model, a synthetic image based on the adapted text embedding, wherein the synthetic image includes content described by the text prompt.

A method, apparatus, non-transitory computer readable medium, and system for image processing are described. One or more aspects of the method, apparatus, non-transitory computer readable medium, and system include obtaining training data including a training image and a text label describing the training image; encoding, using a text encoder, the text label to obtain a preliminary text embedding; and training, using the training image, an adaptor network to adapt the preliminary text embedding for an image generation model.

An apparatus, system, and method for image processing are described. One or more aspects of the apparatus, system, and method include at least one processor; at least one memory storing instructions and in electronic communication with the at least one processor; a text encoder comprising parameters stored in the at least one memory and trained to encode a text prompt to obtain a preliminary text embedding; an adaptor network comprising parameters stored in the at least one memory and trained to generate an adapted text embedding based on the preliminary text embedding; and an image generation model comprising parameters stored in the at least one memory and trained to generate a synthetic image based on the adapted text embedding, wherein the synthetic image includes content described by the text prompt.

DETAILED DESCRIPTION

Figure 1:
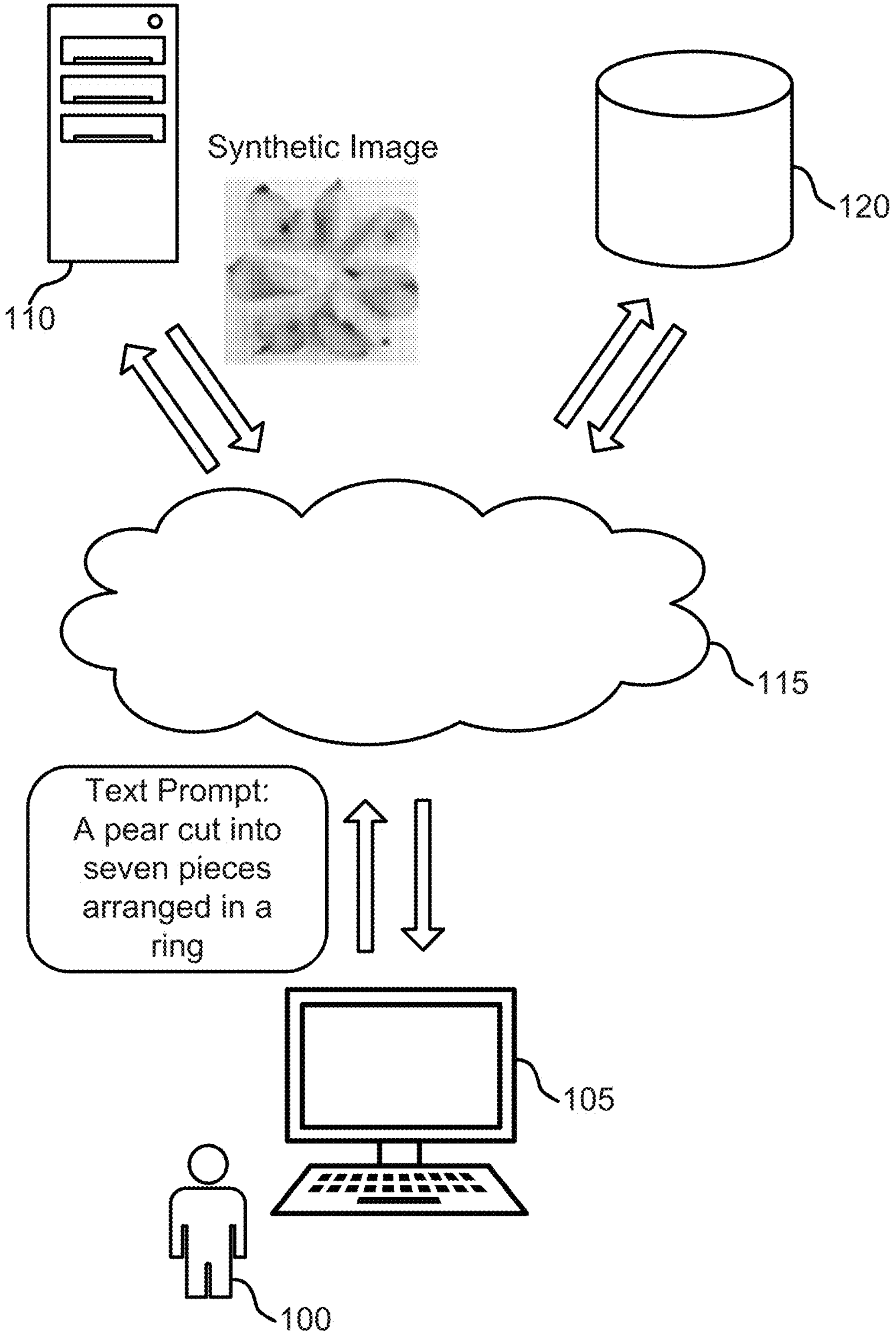
FIG. 1 shows an example of an image processing system according to aspects of the present disclosure.

Aspects of the present disclosure provide methods, non-transitory computer readable media, apparatuses, and systems for image generation. According to an aspect of the present disclosure, an image generation model is trained to generate a synthetic image based on a prompt (e.g., a text prompt). In some cases, embodiments of the present disclosure include a text encoder that encodes the text prompt to generate a preliminary text embedding. Embodiments of the present disclosure include an adaptor network that generates an adapted text embedding based on the preliminary text embedding. For example, the adaptor network can be used to augment the text encoder. The image generation model generates a synthetic image based on the adapted text embedding. By using the adaptor network, the image generation model is able to accurately generate a synthetic image that includes content described by the text prompt.

A subfield in image generation relates to text-to-image generation that uses a machine learning model to generate image content based on a text input. In some cases, the conventional text-to-image generation model includes a diffusion model that relies on pre-trained text encoders to generate the image. The quality of the generated images depends on matching a textual description of the input text and features of the generated image. However, many large language models (LLMs), which include the pre-trained text encoder, are trained purely on text data, which limits the effectiveness of conventional image generation models. Furthermore, the text embeddings generated by the text encoders exhibit a domain gap that hinders effective image generation, leading to suboptimal text-image alignment results. In some cases, fine-tuning is applied to text encoders to reduce the domain gap. However, fine-tuning can be resource-intensive, as training LLMs uses significant memory and computational power.

In some cases, text encoders are trained jointly with an image encoder. In some cases, conventional image generation models are fine-tuned when training the image generation models. However, conventional image generation models are incapable of handling long and complex text inputs (or text prompts). In some cases, the text prompt is long, complex, and compound. For example, the text prompt includes one or more sentences. Additionally, the image generation models are unable to generate images that accurately depict the content described in the text prompts.

In some cases, image generation models generate images that inaccurately depict the text prompt. For example, the text prompt may state "A stack of 3 books. A green book is on the top, sitting on a red book. The red book is in the middle, sitting on a blue book. The blue book is on the bottom." An image generation model may generate books having various numbers and colors of books in a different configuration than that described by the text prompt.

Accordingly, the present disclosure provides systems and methods that improve on conventional text-to-image generation models by generating images that more accurately depict relationships, configurations, and other complex aspects of a text prompt. Whereas conventional image generators create images that include an incorrect number or configuration of objects, embodiments of the disclosure generate synthetic images that include the correct number or relationships based on the prompt. For example, an image generation model may generate a synthetic image depicting multiple books stacked in a configuration and having colors specified by a text prompt.

According to some embodiments, accurate images are generated using an adaptor network to augment a text encoder. Long and complex text prompt can be encoded into one or more adapted text embeddings. The image generation model learns the complex relationships, configurations, and other complex aspects of the text prompt, and accurately generates a synthetic image. The adaptor network can be trained using training data including complex prompts and images correctly depicting the objects described in the complex prompts.

Some embodiments of the present disclosure include an adaptor network with ensemble architecture that reduces the susceptibility to overfitting in the adaptor network. For example, the adaptor network is trained to learn the underlying pattern within a training dataset rather than memorizing the training dataset. As a result, the adaptor network is able to effectively generalize on unseen or new data and is not confined to the training dataset. Accordingly, the ensemble architecture within the adaptor network increases the robustness of the image generation system.

According to some embodiments, the adaptor network receives a text embedding generated by a language model (e.g., a text encoder) and generates an adapted text embedding. The adapted text embedding is provided to an image generation model to generate a synthetic image. In one aspect, the same adaptor network can be used with different versions or types of text encoder (e.g., even if an improved or a new text encoder is introduced) because the adaptor network is used to augment the text encoder. In some cases, the text encoder is not fine-tuned prior to deployment and thus reduces deployment cost. In some cases, the text encoder can be shared with other features to reduce deployment time during testing.

By applying the adaptor network to augment the text encoder, embodiments of the present disclosure can enhance image processing applications such as content creation, visual art design, marketing, and storyboarding by generating synthetic images that accurately reflect the content of the text prompt. Additionally, the adaptor network of the present disclosure can be used to complement (e.g., increase the performance of) different versions or types of text encoders. By using the adaptor network during training, embodiments of the present disclosure can increase the model capacity and reduce the training cost.

Figure 2:
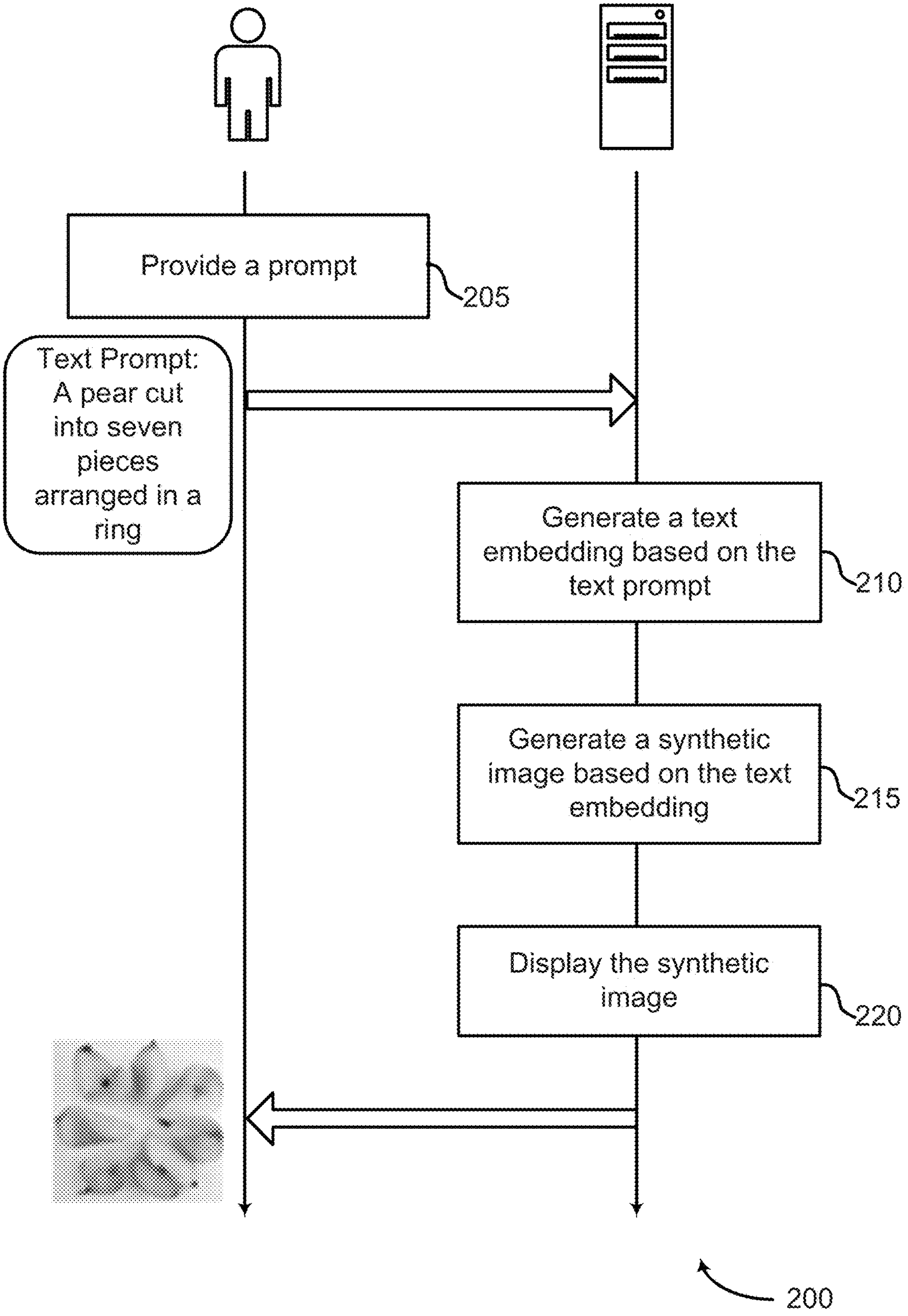
FIG. 2 shows an example of a method for generating a synthetic image according to aspects of the present disclosure.

An example application of the inventive concept in image processing is provided with reference to FIGS. 2-3. Details regarding the architecture of an image processing apparatus are provided with reference to FIGS. 5-8. An Example of a process for document retrieval is provided with reference to FIGS. 4 and 9. A description of an example training process is provided with reference to FIG. 10.

Image Processing

In FIGS. 1-4, a method, apparatus, non-transitory computer readable medium, and system for image processing are described. One or more aspects of the method, apparatus, non-transitory computer readable medium, and system include obtaining a text prompt; encoding, using a text encoder, the text prompt to obtain a preliminary text embedding; generating, using an adaptor network, an adapted text embedding based on the preliminary text embedding, wherein the adaptor network is trained to adapt the preliminary text embedding for generating an input to an image generation model; and generating, using the image generation model, a synthetic image based on the adapted text embedding, wherein the synthetic image includes content described by the text prompt.

Some examples of the method, apparatus, non-transitory computer readable medium, and system further include generating, using a plurality of adaptor networks, a plurality of adapted text embeddings based on the preliminary text embedding, wherein the synthetic image is generated based on the plurality of adapted text embeddings. Some examples of the method, apparatus, non-transitory computer readable medium, and system further include combining the plurality of adapted text embeddings to obtain a combined text embedding, wherein the synthetic image is generated based on the combined text embedding.

In some aspects, the preliminary text embedding is combined with the plurality of adapted text embeddings to obtain the combined text embedding. In some aspects, the text encoder is pre-trained independently of the image generation model.

Some examples of the method, apparatus, non-transitory computer readable medium, and system further include obtaining a noisy image. Some examples further include performing a reverse diffusion process on the noisy image using the image generation model to obtain the synthetic image. Some examples of the method, apparatus, non-transitory computer readable medium, and system further include performing self-attention on the preliminary text embedding.

FIG. 1 shows an example of an image processing system according to aspects of the present disclosure. The example shown includes user 100, user device 105, image processing apparatus 110, cloud 115, and database 120. Image processing apparatus 110 is an example of, or includes aspects of, the corresponding element described with reference to FIG. 5.

Referring to FIG. 1, according to some embodiments, user 100 provides a text prompt to image processing apparatus 110 via user device 105 and cloud 115. For example, the text prompt states "A pear cut into seven pieces arranged in a ring." In some cases, the text prompt is a voiced-based statement or text-based statement. In some cases, image processing apparatus 110 generates a synthetic image based on the text prompt, where the synthetic image includes content described by the text prompt. For example, the synthetic image in FIG. 1 illustrates seven pieces of a pear arranged in a ring shape. In some embodiments, image processing apparatus 110 displays the synthetic image to user 100 via user device 105 and cloud 115.

In some embodiments, image processing apparatus 110 generates a preliminary text embedding based on the text prompt. In some embodiments, image processing apparatus 110 generates an adapted text embedding based on the preliminary text embedding. In some embodiments, image processing apparatus 110 generates a synthetic image based on the adapted text embedding.

User device 105 may be a personal computer, laptop computer, mainframe computer, palmtop computer, personal assistant, mobile device, or any other suitable processing apparatus. In some examples, user device 105 includes software that incorporates an image detection application. In some examples, the image detection application on user device 105 may include functions of image processing apparatus 110.

A user interface may enable user 100 to interact with user device 105. In some embodiments, the user interface may include an audio device, such as an external speaker system, an external display device such as a display screen, or an input device (e.g., a remote-controlled device interfaced with the user interface directly or through an I/O controller module). In some cases, a user interface may be a graphical user interface (GUI). In some examples, a user interface may be represented in code in which the code is sent to the user device 105 and rendered locally by a browser. The process of using the image processing apparatus 110 is further described with reference to FIG. 2.

Image processing apparatus 110 is an example of, or includes aspects of, the corresponding element described with reference to FIG. 5. According to some aspects, image processing apparatus 110 includes a computer implemented network comprising a machine learning model, a text encoder, an adaptor network, and an image generation model. Image processing apparatus 110 further includes a processor unit, a memory unit, an I/O module, and a training component. In some embodiments, image processing apparatus 110 further includes a communication interface, user interface components, and a bus as described with reference to FIG. 11. Additionally, image processing apparatus 110 communicates with user device 105 and database 125 via cloud 115. Further detail regarding the operation of image processing apparatus 110 is provided with reference to FIGS. 2, 4, and 9.

In some cases, image processing apparatus 110 is implemented on a server. A server provides one or more functions to users linked by way of one or more of the various networks. In some cases, the server includes a single microprocessor board, which includes a microprocessor responsible for controlling aspects of the server. In some cases, a server uses the microprocessor and protocols to exchange data with other devices/users on one or more of the networks via hypertext transfer protocol (HTTP), and simple mail transfer protocol (SMTP), although other protocols such as file transfer protocol (FTP), and simple network management protocol (SNMP) may also be used. In some cases, a server is configured to send and receive hypertext markup language (HTML) formatted files (e.g., for displaying web pages). In various embodiments, a server comprises a general-purpose computing device, a personal computer, a laptop computer, a mainframe computer, a supercomputer, or any other suitable processing apparatus.

Cloud 115 is a computer network configured to provide on-demand availability of computer system resources, such as data storage and computing power. In some examples, cloud 115 provides resources without active management by the user (e.g., user 100). The term cloud is sometimes used to describe data centers available to many users over the Internet. Some large cloud networks have functions distributed over multiple locations from central servers. A server is designated an edge server if the server has a direct or close connection to a user. In some cases, cloud 115 is limited to a single organization. In other examples, cloud 115 is available to many organizations. In one example, cloud 115 includes a multi-layer communications network comprising multiple edge routers and core routers. In another example, cloud 115 is based on a local collection of switches in a single physical location.

According to some aspects, database 120 stores a plurality of documents. Database 120 is an organized collection of data. For example, database 120 stores data in a specified format known as a schema. Database 120 may be structured as a single database, a distributed database, multiple distributed databases, or an emergency backup database. In some cases, a database controller may manage data storage and processing in database 120. In some cases, a user (e.g., user 100) interacts with the database controller. In other cases, the database controller may operate automatically without user interaction.

FIG. 2 shows an example of a method 200 for generating a synthetic image according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

Referring to FIG. 2, according to some aspects, an image processing apparatus (such as the image processing apparatus described with reference to FIGS. 1 and 5) generates a synthetic image based on a prompt (e.g., a text prompt). In some embodiments, the image processing apparatus generates a preliminary text embedding and one or more adapted text embeddings based on the text prompt. In some embodiments, the one or more adapted text embeddings are generated based on the preliminary text embedding. The preliminary text embedding and the one or more adapted text embeddings are combined into a text embedding. The image processing apparatus generates one or more images based on the combined text embedding.

At operation 205, the system provides a prompt. In some cases, the operations of this step refer to, or may be performed by, a user as described with reference to FIG. 1. For example, in some cases, the user provides a text prompt to the image processing apparatus (e.g., the image processing apparatus described with reference to FIGS. 1 and 5) via a user interface provided by the image processing apparatus on a user device (e.g., the user device described with reference to FIG. 1). For example, the text prompt is a text-based statement that states "A pear cut into seven pieces arranged in a ring." In some cases, the text prompt is voice-based. In some cases, the text prompt includes one or more sentences.

At operation 210, the system generates a text embedding based on the text prompt. In some cases, the operations of this step refer to, or may be performed by, an image processing apparatus as described with reference to FIGS. 1 and 5. In some cases, the operations of this step refer to, or may be performed by, an adaptor network as described with reference to FIGS. 5-7. For example, in some cases, the adaptor network receives a preliminary text embedding generated by a text encoder (e.g., a pre-trained text encoder) to generate an adapted text embedding based on the preliminary text embedding. The adapted text embedding includes contents described by the text prompt.

As used herein, the term "embedding" refers to a numerical representation of words, sentences, documents, or images in a vector space. The embedding is used to encode semantic meaning, relationships, and context of the words, sentences, documents, or images where the encoding can be processed by a machine learning model.

At operation 215, the system generates a synthetic image based on the text embedding. In some cases, the operations of this step refer to, or may be performed by, an image processing apparatus as described with reference to FIGS. 1 and 5. In some cases, the operations of this step refer to, or may be performed by, an image generation model as described with reference to FIGS. 3, 5, and 6. For example, the image generation model includes a diffusion model, where the diffusion model is trained to generate one or more synthetic images based on text embedding. Further details on the diffusion model are described with reference to FIG. 8.

At operation 220, the system displays the synthetic image. In some cases, the operations of this step refer to, or may be performed by, an image processing apparatus as described with reference to FIGS. 1 and 5. For example, the synthetic image includes an image of seven pieces of a pear arranged in a ring shape. In some cases, the synthetic image is displayed on a user device via a user interface of the image processing apparatus and cloud.

Figure 3A:
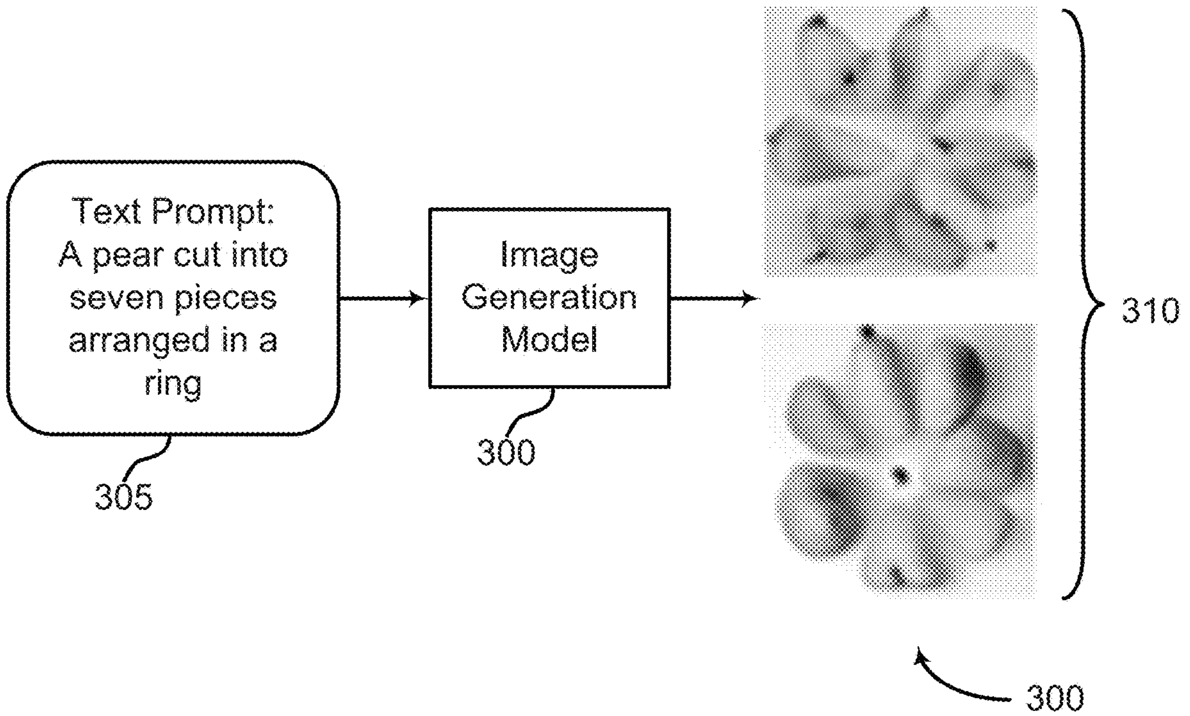
FIGS. 3A and 3B show examples of text-to-image diffusion according to aspects of the present disclosure.
Figure 3B:
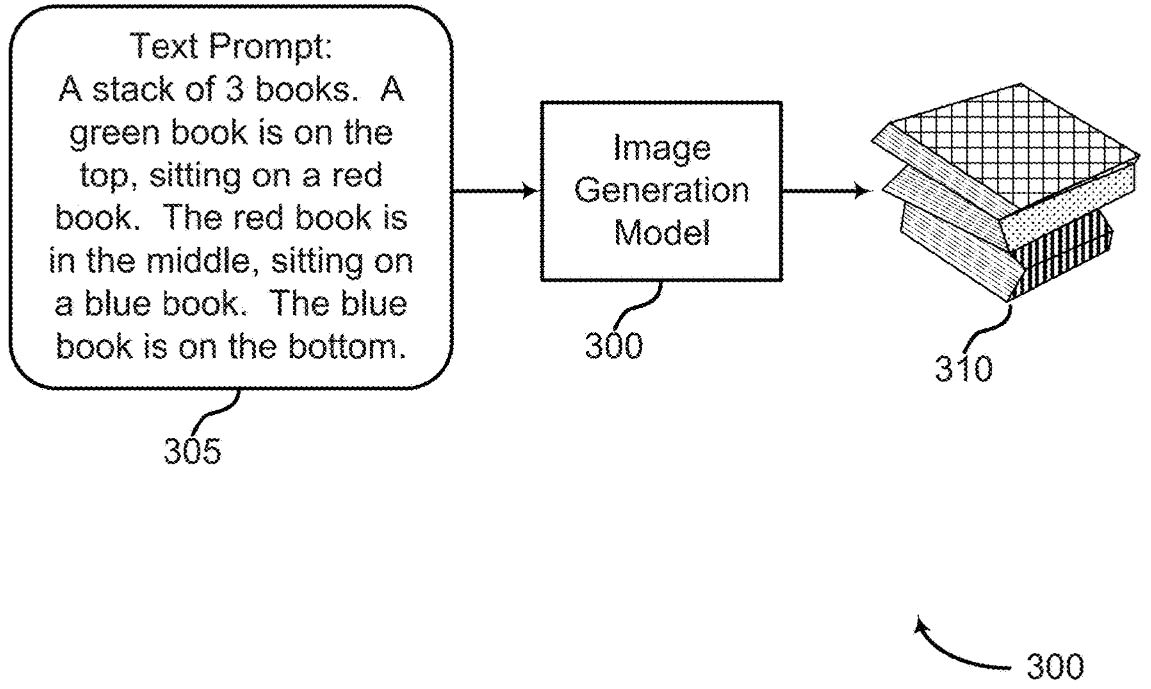

FIGS. 3A and 3B show examples of text-to-image diffusion according to aspects of the present disclosure. The example shown includes image generation model 300, text prompt 305, and synthetic image 310. Image generation model 300 is an example of, or includes aspects of, the corresponding element described with reference to FIGS. 5 and 6.

Referring to FIGS. 3A and 3B, image generation model 300 receives text prompt 305 and generates synthetic image 310. In some cases, synthetic image 310 includes one or more images. In some cases, text prompt 305 is provided by a user. For example, as shown in FIG. 3A, text prompt 305 states "A pear cut into seven pieces arranged in a ring." Image generation model 300 generates synthetic image 310 that includes contents of text prompt 305. For example, synthetic image 310 illustrates seven pieces of a pear arranged in a ring shape.

Conventional image generation models are unable to generate an image that includes the contents of text prompt 305. For example, conventional image generation models are unable to extract all information in text prompt 305. In some cases, conventional image generation models generate oranges or slices of an orange instead of a pear. In some cases, conventional image generation models generate pear, or slices of pear, but not arranged in a ring shape. As a result, conventional image generation models can generate images that include contents of a portion of text prompt 305. Furthermore, conventional image generation models are unable to accurately encode the text prompt 305 into a text embedding.

As shown in FIG. 3B, text prompt 305 states "A stack of 3 books. A green book is on the top, sitting on a red book. The red book is in the middle, sitting on a blue book. The blue book is on the bottom." Text prompt 305 includes multiple sentences describing the configuration of a stack of books. A conventional image generation model is unable to generate an image that includes contents described by text prompt 305. For example, the generated image may illustrate a stack of books, a stack of books having a variety of colors, or the correct colored books but not stacked on top of one another in the configuration specified by text prompt 305. However, image generation model 300 of the present disclosure is able to generate synthetic image 310 that depicts the correct configuration of books specified by text prompt 305. For example, a green book (represented with grids) is disposed on top of a red book (represented with dots). The red book is disposed between the red book and a blue book (represented with vertical lines), where the blue book is on the bottom.

Text prompt 305 is an example of, or includes aspects of, the corresponding element described with reference to FIGS. 6-8. Synthetic image 310 is an example of, or includes aspects of, the corresponding element described with reference to FIG. 6.

Figure 4:
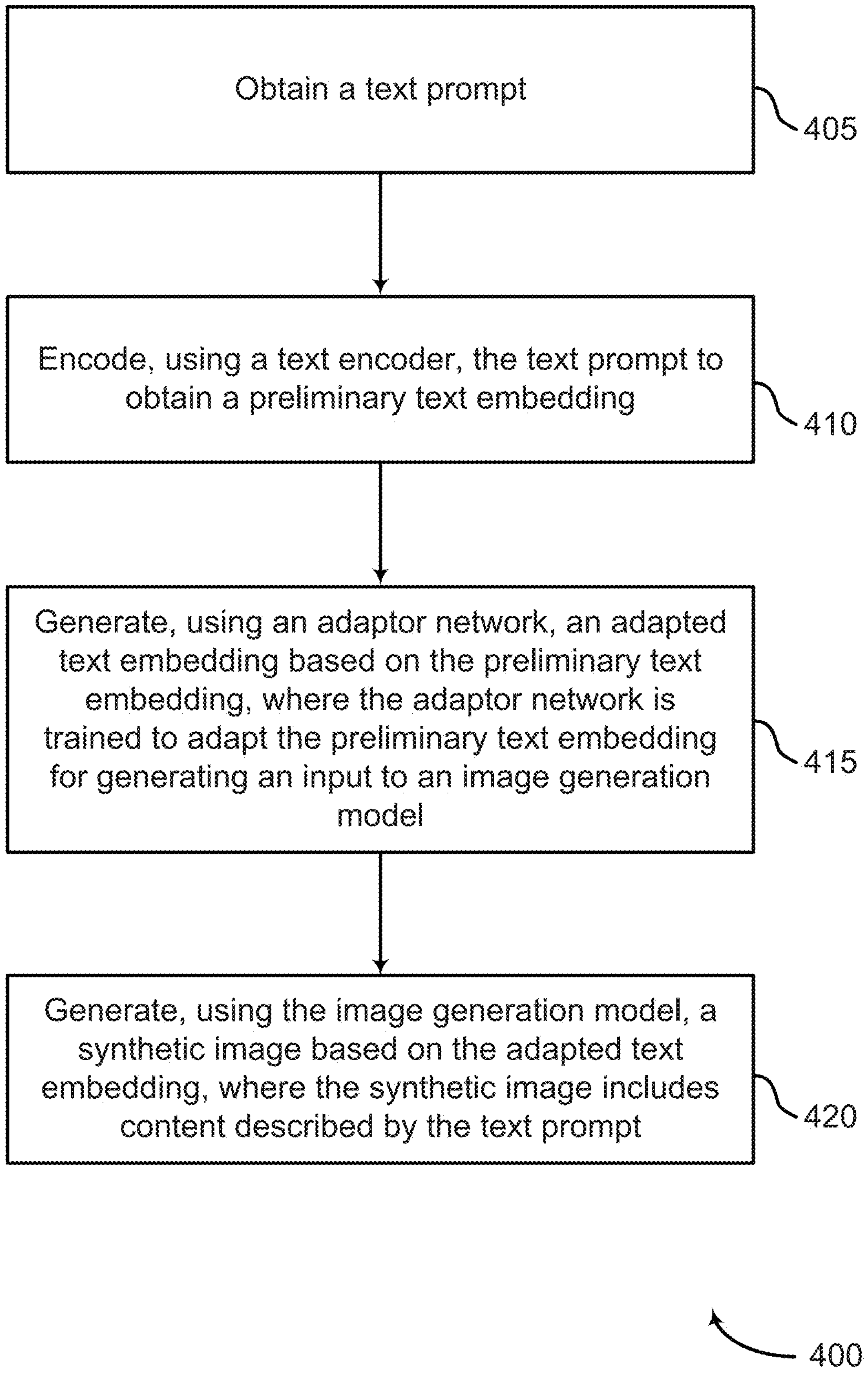
FIG. 4 shows an example of a method for generating a synthetic image based on a text prompt according to aspects of the present disclosure.

FIG. 4 shows an example of a method 400 for generating a synthetic image based on a text prompt according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 405, the system obtains a text prompt. In some cases, the operations of this step refer to, or may be performed by, a machine learning model as described with reference to FIG. 5. For example, the text prompt is provided by a user. In some cases, the text prompt is text-based or voice-based. In some examples, the text prompt includes one or more sentences.

At operation 410, the system encodes, using a text encoder, the text prompt to obtain a preliminary text embedding. In some cases, the operations of this step refer to, or may be performed by, a text encoder as described with reference to FIGS. 5-8. In some cases, for example, the text encoder is pre-trained independently of the image generation model. In some cases, a large language model (LLM)

includes the text encoder. In some cases, the preliminary text embedding includes the semantic meaning, relationships, and context of a word in the text encoder.

At operation 415, the system generates, using an adaptor network, an adapted text embedding based on the preliminary text embedding, where the adaptor network is trained to adapt the preliminary text embedding for generating an input to an image generation model. In some cases, the operations of this step refer to, or may be performed by, an adaptor network as described with reference to FIGS. 5-7. In some embodiments, the adaptor network includes a plurality of adaptor networks, where the plurality of adaptor networks generate a plurality of adapted text embeddings, respectively, based on the preliminary text embedding. In some embodiments, the plurality of adaptor networks generates a plurality of adapted text embeddings, respectively, based on the text prompt. Further details on the adaptor network are described with reference to FIG. 7.

In some embodiments, for example, the adaptor network is trained using an image generation model that generates images based on an output of the adaptor network. In some embodiments, for example, the adaptor network is trained using training data that includes a text label describing a ground-truth image.

At operation 420, the system generates, using the image generation model, a synthetic image based on the adapted text embedding, where the synthetic image includes content described by the text prompt. In some cases, the operations of this step refer to, or may be performed by, an image generation model as described with reference to FIGS. 3, 5, and 6. In some cases, for example, the image generation model generates one or more synthetic images based on the adapted text embedding, where each of the one or more synthetic images also includes content described by the text prompt. In some embodiments, the image generation model includes a diffusion model.

System Architecture

In FIGS. 5-8, an apparatus, system, and method for image processing are described. One or more aspects of the apparatus, system, and method include at least one processor; at least one memory storing instructions and in electronic communication with the at least one processor; a text encoder comprising parameters stored in the at least one memory and trained to encode a text prompt to obtain a preliminary text embedding; an adaptor network comprising parameters stored in the at least one memory and trained to generate an adapted text embedding based on the preliminary text embedding; and an image generation model comprising parameters stored in the at least one memory and trained to generate a synthetic image based on the adapted text embedding, wherein the synthetic image includes content described by the text prompt.

Some examples of the apparatus, system, and method further include a plurality of adaptor networks comprising parameters stored in the at least one memory and trained to generate a plurality of adapted text embeddings based on the preliminary text embedding. In some examples, the synthetic image is generated based on the plurality of adapted text embeddings.

In some aspects, the plurality of adaptor networks comprises an ensemble architecture. In some aspects, the image generation model is a diffusion model. In some aspects, the text encoder comprises an encoder of a text generation model.

Figure 5:
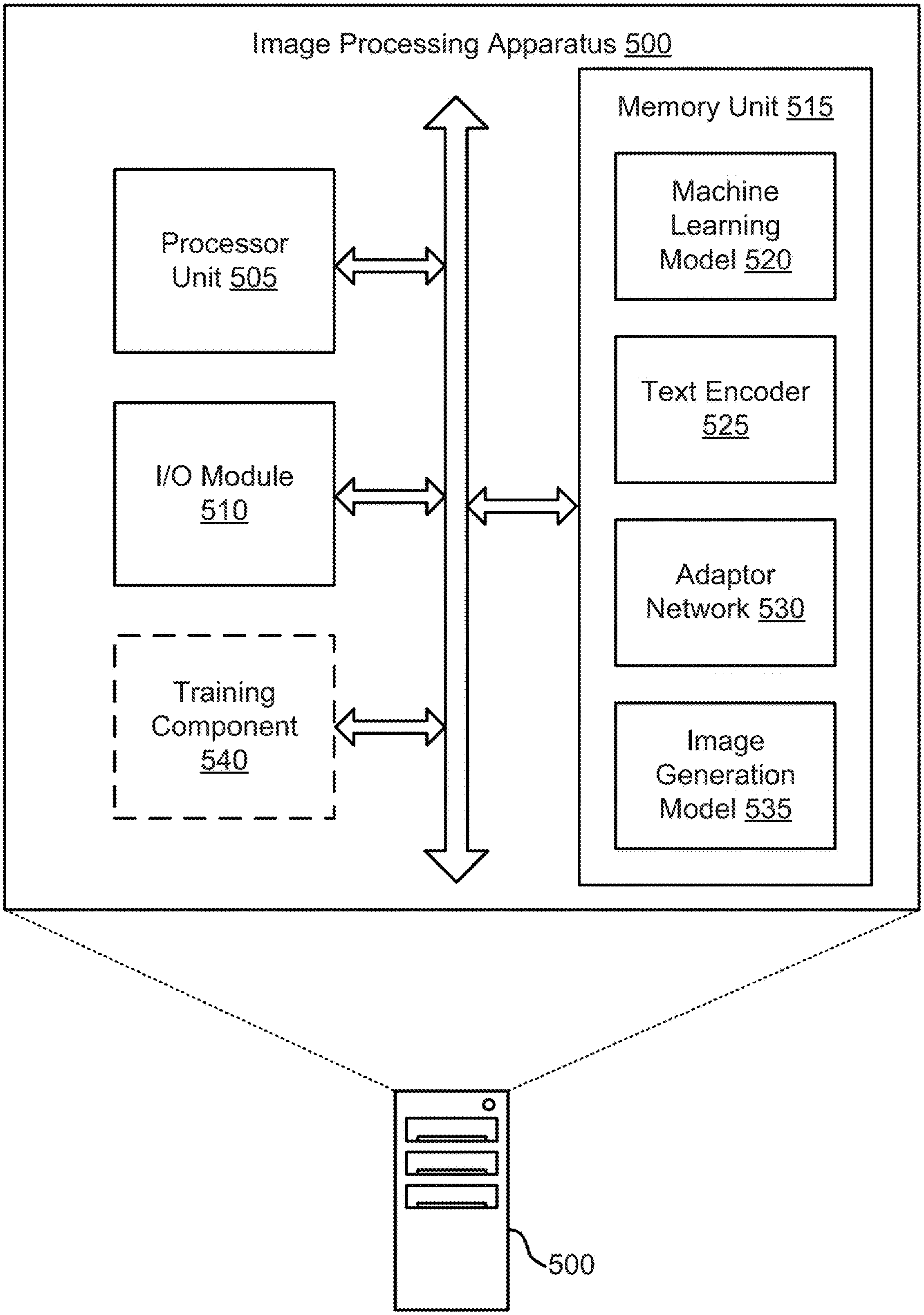
FIG. 5 shows an example of an image processing apparatus according to aspects of the present disclosure.

FIG. 5 shows an example of an image processing apparatus 500 according to aspects of the present disclosure. The example shown includes image processing apparatus 500, processor unit 505, I/O module 510, memory unit 515, and training component 540. Image processing apparatus 500 is an example of, or includes aspects of, the corresponding element described with reference to FIG. 1. In one aspect, memory unit 515 includes machine learning model 520, text encoder 525, adaptor network 530, and image generation model 535. In some embodiments, machine learning model 520 includes text encoder 525, adaptor network 530, and image generation model 535.

According to some embodiments of the present disclosure, image processing apparatus 500 includes a computer-implemented artificial neural network (ANN). An ANN is a hardware or a software component that includes a number of connected nodes (e.g., artificial neurons), which loosely correspond to the neurons in a human brain. Each connection, or edge, transmits a signal from one node to another (like the physical synapses in a brain). When a node receives a signal, the node processes the signal and then transmits the processed signal to other connected nodes. In some cases, the signals between nodes comprise real numbers, and the output of each node is computed by a function of the sum of its inputs. In some examples, nodes may determine the output using other mathematical algorithms (e.g., selecting the max from the inputs as the output) or any other suitable algorithm for activating the node. Each node and edge is associated with one or more node weights that determine how the signal is processed and transmitted.

During the training process, the one or more node weights are adjusted to increase the accuracy of the result (e.g., by minimizing a loss function which corresponds in some way to the difference between the current result and the target result). The weight of an edge increases or decreases the strength of the signal transmitted between nodes. In some cases, nodes have a threshold below which a signal is not transmitted at all. In some examples, the nodes are aggregated into layers. Different layers perform different transformations on the corresponding inputs. The initial layer is known as the input layer and the last layer is known as the output layer. In some cases, signals traverse certain layers multiple times.

According to some embodiments, image processing apparatus 500 includes a computer-implemented convolutional neural network (CNN). CNN is a class of neural network commonly used in computer vision or image classification systems. In some cases, a CNN may enable processing of digital images with minimal pre-processing. A CNN may be characterized by the use of convolutional (or cross-correlational) hidden layers. These layers apply a convolution operation to the input before signaling the result to the next layer. Each convolutional node may process data for a limited field of input (e.g., the receptive field). During a forward pass of the CNN, filters at each layer may be convolved across the input volume, computing the dot product between the filter and the input. During the training process, the filters may be modified so that the filters activate when the filters detect a particular feature within the input.

Processor unit 505 is an intelligent hardware device, (e.g., a general-purpose processing component, a digital signal processor (DSP), a central processing unit (CPU), a graphics processing unit (GPU), a microcontroller, an application-specific integrated circuit (ASIC), a field programmable gate array (FPGA), a programmable logic device, a discrete gate or transistor logic component, a discrete hardware component, or any combination thereof). In some cases, processor unit 505 is configured to operate a memory array using a memory controller. In other cases, a memory controller is integrated into the processor. In some cases, processor unit

505 is configured to execute computer-readable instructions stored in a memory to perform various functions. In some embodiments, processor unit 505 includes special-purpose components for modem processing, baseband processing, digital signal processing, or transmission processing. Processor unit 505 is an example of, or includes aspects of, the processor described with reference to FIG. 11.

I/O module 510 (e.g., an input/output interface) may include an I/O controller. An I/O controller may manage input and output signals for a device. I/O controller may also manage peripherals not integrated into a device. In some cases, an I/O controller may represent a physical connection or port to an external peripheral. In some cases, an I/O controller may utilize an operating system such as iOS®, ANDROID®, MS-DOS®, MS-WINDOWS®, OS/2®, UNIX®, LINUX®, or another known operating system. In other cases, an I/O controller may represent or interact with a modem, a keyboard, a mouse, a touchscreen, or a similar device. In some cases, an I/O controller may be implemented as part of a processor. In some cases, a user may interact with a device via an I/O controller or via hardware components controlled by an I/O controller.

In some examples, I/O module 510 includes a user interface. A user interface may enable a user to interact with a device. In some embodiments, the user interface may include an audio device, such as an external speaker system, an external display device such as a display screen, or an input device (e.g., a remote control device interfaced with the user interface directly or through an I/O controller module). In some cases, a user interface may be a graphical user interface (GUI). In some examples, a communication interface operates at the boundary between communicating entities and the channel and may also record and process communications. Communication interface is provided herein to enable a processing system coupled to a transceiver (e.g., a transmitter and/or a receiver). In some examples, the transceiver is configured to transmit (or send) and receive signals for a communications device via an antenna.

Examples of memory unit 515 include random access memory (RAM), read-only memory (ROM), or a hard disk. Examples of memory unit 515 include solid-state memory and a hard disk drive. In some examples, memory unit 515 is used to store computer-readable, computer-executable software including instructions that, when executed, cause a processor to perform various functions described herein. In some cases, memory unit 515 contains, among other things, a basic input/output system (BIOS) that controls basic hardware or software operations such as the interaction with peripheral components or devices. In some cases, a memory controller operates memory cells. For example, the memory controller can include a row decoder, column decoder, or both. In some cases, memory cells within memory unit 515 store information in the form of a logical state. Memory unit 515 is an example of, or includes aspects of, the memory subsystem described with reference to FIG. 11.

In one aspect, memory unit 515 includes instructions executable by processor unit 505. In one aspect, memory unit 515 includes machine learning model 520 or stores parameters of machine learning model 520. In one aspect, memory unit 515 includes machine learning model 520, text encoder 525, adaptor network 530, and image generation model 535.

According to some aspects, machine learning model 520 obtains a text prompt. In some examples, machine learning model 520 obtains a noisy image. According to some aspects, machine learning model 520 obtains training data including a training image and a text label describing the training image.

According to some aspects, text encoder 525 encodes the text prompt to obtain a preliminary text embedding. In some aspects, the text encoder 525 is pre-trained independently of the image generation model 535. In some aspects, the text encoder 525 is pre-trained independently of the adaptor network 530.

According to some aspects, text encoder 525 comprises parameters stored in the at least one memory and trained to encode a text prompt to obtain a preliminary text embedding. In some aspects, the text encoder 525 includes an encoder of a text generation model. Text encoder 525 is an example of, or includes aspects of, the corresponding element described with reference to FIGS. 6-8.

According to some aspects, adaptor network 530 generates an adapted text embedding based on the preliminary text embedding, where the adaptor network 530 is trained using an image generation model 535. In some embodiments, adaptor network 530 includes a set of adaptor networks. In some examples, a set of adaptor networks generates a set of adapted text embeddings based on the preliminary text embedding, where the synthetic image is generated based on the set of adapted text embeddings.

In some examples, adaptor network 530 combines the set of adapted text embeddings to obtain a combined text embedding, where the synthetic image is generated based on the combined text embedding. In some aspects, the preliminary text embedding is combined with the set of adapted text embeddings to obtain the combined text embedding.

In some examples, adaptor network 530 performs self-attention on the preliminary text embedding. In some aspects, the adaptor network 530 is jointly trained with the image generation model 535. The term "self-attention" refers to a machine learning model (e.g., machine learning model 520) in which representations of the input interact with each other to determine attention weights for the input. Self-attention can be distinguished from other attention models because the attention weights are determined at least in part by the input itself. Further details on the attention mechanism are described with reference to FIG. 7.

According to some aspects, adaptor network 530 comprises parameters stored in the at least one memory and trained to generate an adapted text embedding based on the preliminary text embedding. In some examples, adaptor network 530 comprises parameters stored in the at least one memory and trained to generate a plurality of adapted text embeddings based on the preliminary text embedding, wherein the synthetic image is generated based on the plurality of adapted text embeddings. In some aspects, the set of adaptor networks includes an ensemble architecture. Adaptor network 530 is an example of, or includes aspects of, the corresponding element described with reference to FIGS. 6 and 7.

According to some aspects, image generation model 535 generates a synthetic image based on the adapted text embedding, where the synthetic image includes content described by the text prompt. In some examples, image generation model 535 performs a reverse diffusion process on the noisy image to obtain the synthetic image. According to some aspects, image generation model 535 generates a synthetic image based on an output of the adaptor network 530.

According to some aspects, image generation model 535 comprises parameters stored in the at least one memory and trained to generate a synthetic image based on the adapted text embedding, wherein the synthetic image includes content described by the text prompt. In some aspects, the image generation model 535 is a diffusion model. Image generation model 535 is an example of, or includes aspects of, the corresponding element described with reference to FIGS. 3 and 6.

According to some aspects, training component 540 trains, using the training image, an adaptor network 530 to adapt the preliminary text embedding for an image generation model 535. In some examples, training component 540 compares the synthetic image and the training image. In some examples, training component 540 computes a loss function based on the synthetic image and the training image. In some examples, training component 540 adds noise to the training image to obtain a noisy image, where the synthetic image is generated using a reverse diffusion process based on the noisy image. In some examples, training component 540 trains a set of adaptor networks based on the image generation model 535.

According to some embodiments, training component 540 is implemented as software stored in memory unit 515 and executable by a processor in processor unit 505 of a separate computing device, as firmware in the separate computing device, as one or more hardware circuits of the separate computing device, or as a combination thereof. In some examples, training component 540 is part of another apparatus other than image processing apparatus 500 and communicates with the image processing apparatus 500. In some examples, training component 540 is part of image processing apparatus 500.

Figure 6:
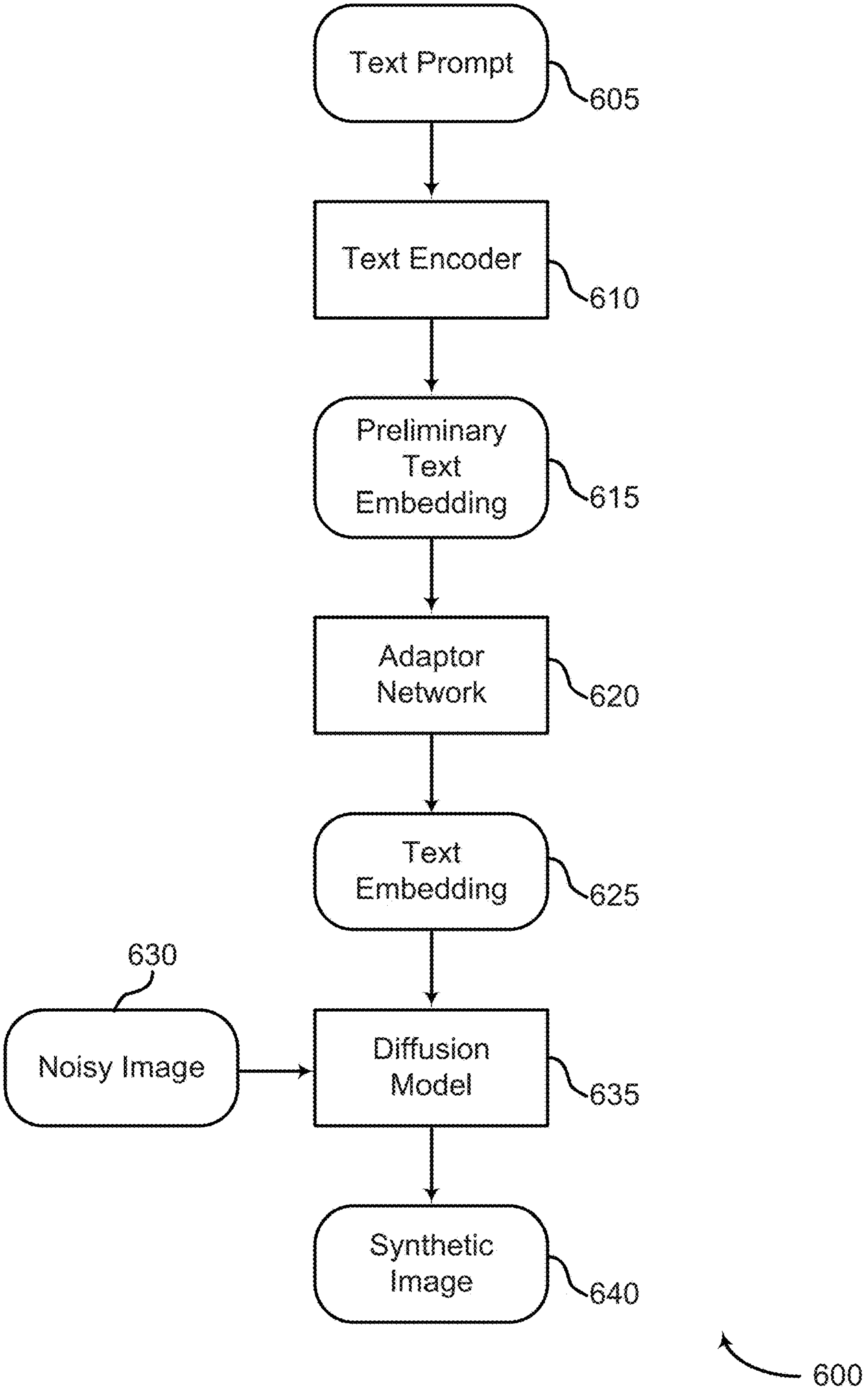
FIG. 6 shows an example of an image generation model according to aspects of the present disclosure.

FIG. 6 shows an example of an image generation model 600 according to aspects of the present disclosure. The example shown includes image generation model 600, text prompt 605, text encoder 610, preliminary text embedding 615, adaptor network 620, text embedding 625, noisy image 630, diffusion model 635, and synthetic image 640.

Referring to FIG. 6. text encoder 610 receives text prompt 605, for example, from a user. Text encoder 610 encodes text prompt 605 to generate preliminary text embedding 615. In some examples, preliminary text embedding 615 includes a numerical representation of text prompt 605 in a vector space. Preliminary text embedding 615 converts the high-dimensional text data into a continuous vector space, where the semantic information and relationships between words or texts are captured in the vector space.

Adaptor network 620 receives preliminary text embedding 615 generated by text encoder 610. Adaptor network 620 generates text embedding 625 based on preliminary text embedding 615. In some cases, text embedding 625 is referred to as adapted text embedding. In some examples, text embedding 625 includes word embeddings or sentence embeddings. For example, word embeddings capture semantic relationships between words, allowing similar words to be represented as similar vectors in the vector space. Text embeddings capture the overall meaning and context of the sentence. In some cases, one or more sentence embeddings are generated based on text prompt 605 or preliminary text embedding 615. For example, when text prompt 605 includes one or more sentences, one or more sentence embeddings are generated. In some cases, one sentence embedding is generated to represent text prompt 605 comprising multiple sentences.

Diffusion model 635 receives noisy image 630 and text embedding 625 generated from adaptor network 620. In some cases, noisy image 630 is provided by a machine learning model (e.g., the machine learning model described with reference to FIG. 5). Diffusion model 635 generates synthetic image 640 based on text embedding 625. In some cases, diffusion model 635 generates a set of synthetic images based on text embedding 625 and noisy image 630. By introducing different noises or noisy images, diffusion model 635 can generate various synthetic images. Synthetic image 640 includes contents described by text prompt 605. For example, the contents include descriptions of objects, color, shape, configuration, size, relationships, and setting.

Image generation model 600 is an example of, or includes aspects of, the corresponding element described with reference to FIGS. 3 and 5. Text prompt 605 is an example of, or includes aspects of, the corresponding element described with reference to FIGS. 3, 7, and 8. Text encoder 610 is an example of, or includes aspects of, the corresponding element described with reference to FIGS. 5, 7, and 8. Preliminary text embedding 615 is an example of, or includes aspects of, the corresponding element described with reference to FIG. 7.

Adaptor network 620 is an example of, or includes aspects of, the corresponding element described with reference to FIGS. 5 and 7. Text embedding 625 is an example of, or includes aspects of, the corresponding element described with reference to FIG. 7. Diffusion model 635 is an example of, or includes aspects of, the corresponding element described with reference to FIG. 8. Synthetic image 640 is an example of, or includes aspects of, the corresponding element described with reference to FIG. 3.

Figure 7:
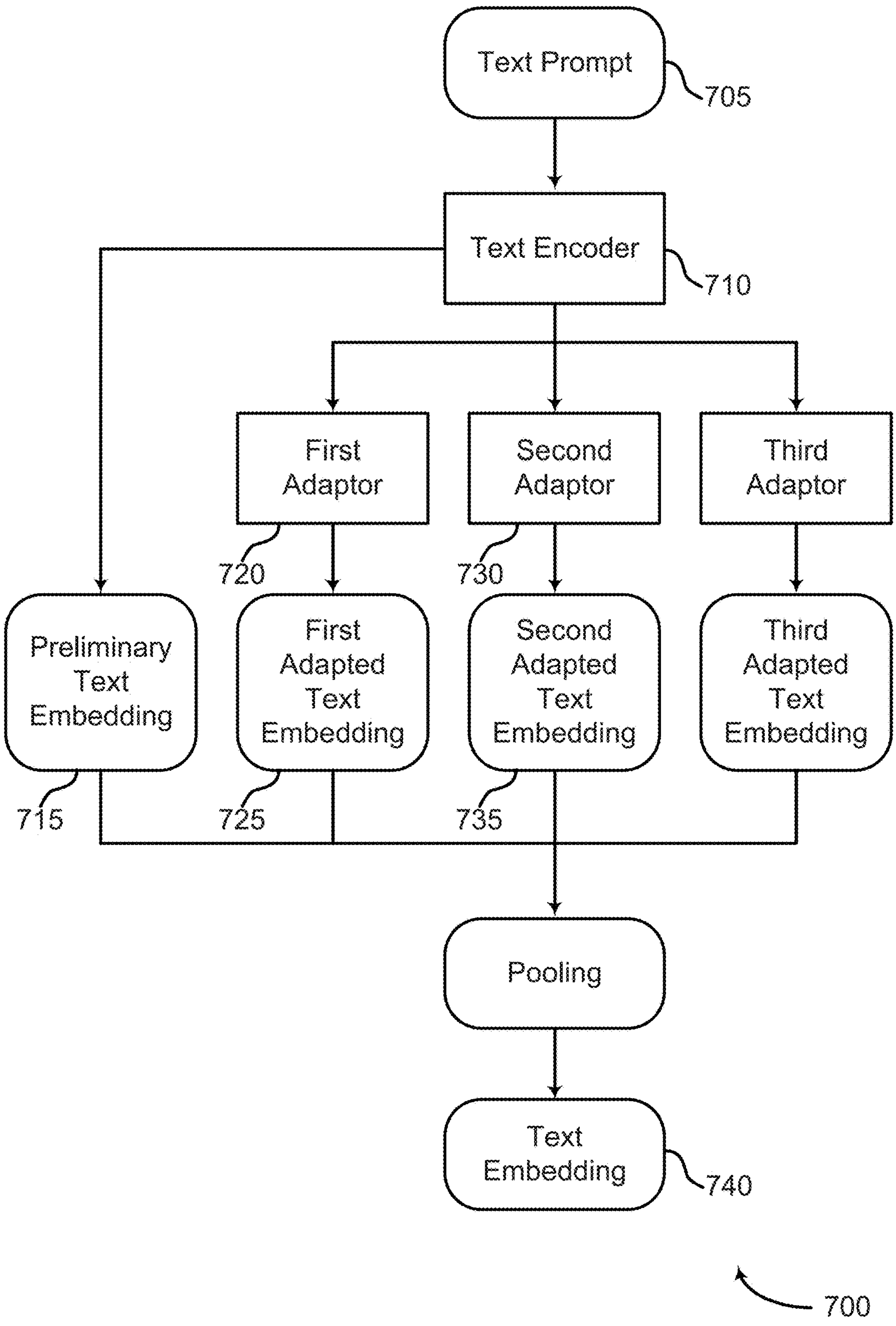
FIG. 7 shows an example of an adaptor network with ensemble architecture according to aspects of the present disclosure.

FIG. 7 shows an example of an adaptor network 700 with ensemble architecture according to aspects of the present disclosure. The example shown includes adaptor network 700, text prompt 705, text encoder 710, preliminary text embedding 715, first adaptor 720, first adapted text embedding 725, second adaptor 730, second adapted text embedding 735, and text embedding 740.

Referring to FIG. 7, text encoder 710 receives text prompt 705 and generates preliminary text embedding 715. In an embodiment, adaptor network 700 includes a plurality of adaptors. For example, adaptor network 700 includes first adaptor 720, second adaptor 730, third adaptor, . . . , and $N^{th}$ adaptor. Each of the adaptors generates an adapted text embedding based on text prompt 705. For example, first adaptor 720 generates first adapted text embedding 725 based on text prompt 705. Second adaptor 730 generates second adapted text embedding 735 based on text prompt 705. In some embodiments, each of the adaptors generates an adapted text embedding based on an intermediate text embedding generated by text encoder 710. In some cases, intermediate text embedding and preliminary text embedding 715 are a same embedding.

Adaptor network 700 performs pooling to generate text embedding 740 based on preliminary text embedding 715, first adapted text embedding 725, second adapted text embedding 735, third adapted text embedding, . . . , and $N^{th}$ adapted text embedding. Pooling can be used to help reduce the dimensionality of the embeddings, aggregate semantic information, and obtain a fixed-size representation that can be used in various image generation models. In some cases, mean pooling or weighted average of the embeddings are applied to perform the pooling during inference time. During training, pooling can be done by using simple mean pooling or stochastic sampling. By using an ensemble architecture with multiple adaptors, over-fitting of the adaptors can be prevented.

In one aspect, the number of adaptors is a hyper-parameter. For example, hyper-parameters are configurations that are not learned from the data during the training of a machine learning model. For example, hyper-parameters include learning rate, batch size, regularization parameters, and number of adaptors. During training, when a machine learning model is initialized, hyper-parameters are identified and determined.

In some embodiments, adaptor network 700 includes transformer blocks with multi-head self-attention. A transformer or transformer network is a type of neural network model used for natural language processing tasks. A transformer network transforms one sequence into another sequence using an encoder and a decoder. The encoder and decoder include modules that can be stacked on top of each other multiple times. The modules comprise multi-head attention and feed-forward layers. The inputs and outputs (target sentences) are first embedded into an n-dimensional space. Positional encoding of the different words (e.g., give every word/part in a sequence a relative position since the sequence depends on the order of its elements) is added to the embedded representation (n-dimensional vector) of each word. In some examples, a transformer network includes an attention mechanism, where the attention looks at an input sequence and decides at each step which other parts of the sequence are important. The attention mechanism involves a query, keys, and values denoted by Q, K, and V, respectively. Q is a matrix that contains the query (vector representation of one word in the sequence), K are all the keys (vector representations of all the words in the sequence) and V are the values, which are again the vector representations of all the words in the sequence. For the encoder and decoder, multi-head attention modules, V consists of the same word sequence as Q. However, for the attention module that takes into account the encoder and the decoder sequences, V is different from the sequence represented by Q. In some cases, values in V are multiplied and summed with some attention-weights a.

In the machine learning field, an attention mechanism is a method of placing differing levels of importance on different elements of an input. Calculating attention may involve three basic steps. First, a similarity between query and key vectors obtained from the input is computed to generate attention weights. Similarity functions used for this process can include dot product, splice, detector, and the like. Next, a softmax function is used to normalize the attention weights. Finally, the attention weights are weighed together with the corresponding values. In the context of an attention network, the key and value are vectors or matrices that are used to represent the input data. The key is used to determine which parts of the input the attention mechanism should focus on, while the value is used to represent the actual data being processed.

The term "self-attention" refers to a machine learning model in which representations of the input interact with each other to determine attention weights for the input. Self-attention can be distinguished from other attention models because the attention weights are determined at least in part by the input itself.

Adaptor network 700 is an example of, or includes aspects of, the corresponding element described with reference to FIGS. 5 and 6. Text prompt 705 is an example of, or includes aspects of, the corresponding element described with reference to FIGS. 3, 6, and 8.

Text encoder 710 is an example of, or includes aspects of, the corresponding element described with reference to FIGS. 5, 6, and 8. Preliminary text embedding 715 is an example of, or includes aspects of, the corresponding element described with reference to FIG. 6. Text embedding 740 is an example of, or includes aspects of, the corresponding element described with reference to FIG. 6.

Figure 8:
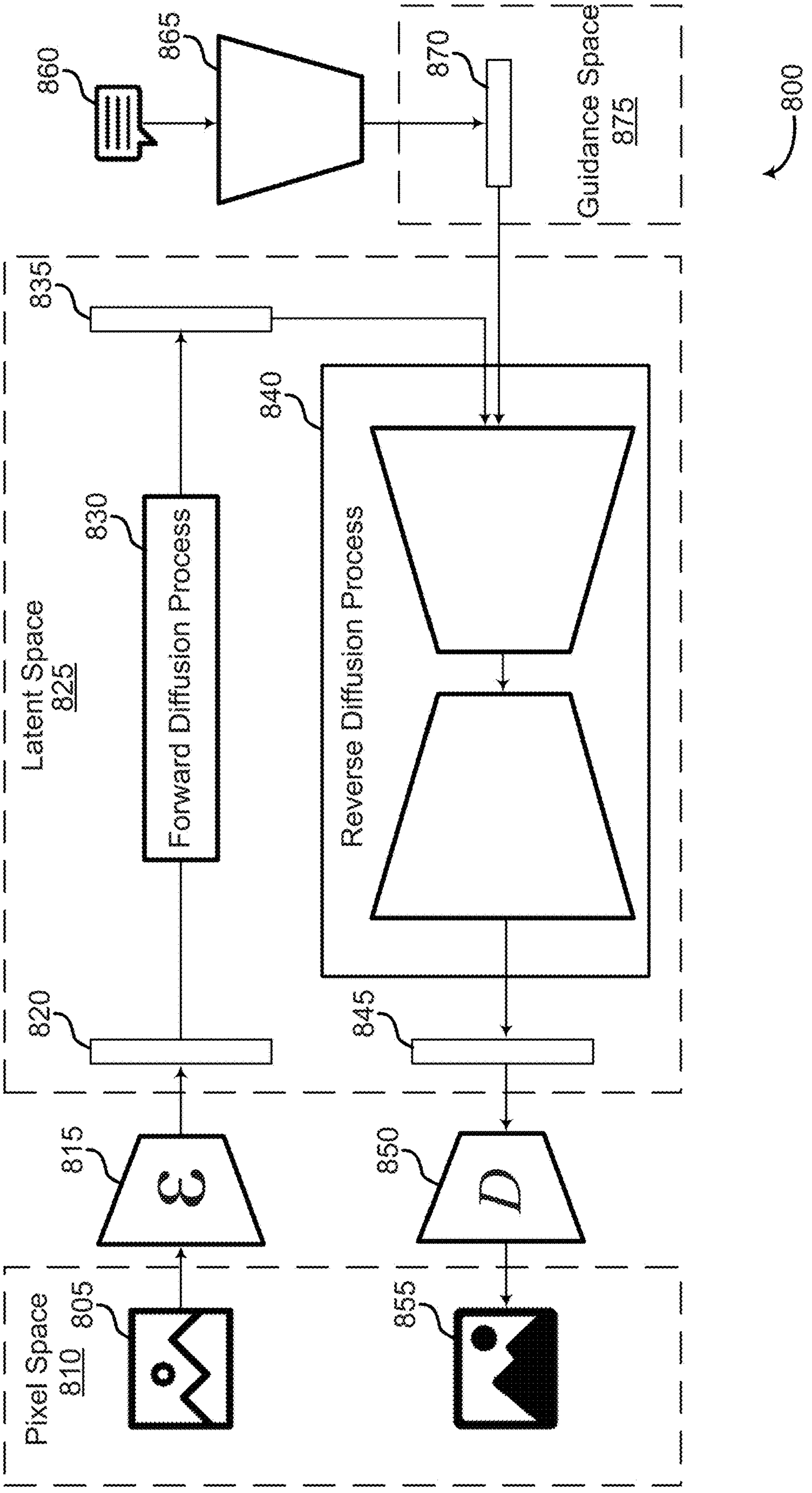
FIG. 8 shows an example of a diffusion model according to aspects of the present disclosure.

FIG. 8 shows an example of a diffusion model 800 according to aspects of the present disclosure. The example shown includes diffusion model 800, original image 805, pixel space 810, image encoder 815, original image feature 820, latent space 825, forward diffusion process 830, noisy feature 835, reverse diffusion process 840, denoised image feature 845, image decoder 850, output image 855, text prompt 860, text encoder 865, guidance feature 870, and guidance space 875. In some cases, diffusion model 800 is a guided latent diffusion model. Diffusion model 800 is an example of, or includes aspects of, the image generation model described with reference to FIGS. 3, 5, and 6.

Diffusion models are a class of generative neural networks which can be trained to generate new data with features similar to features found in training data. In particular, diffusion models can be used to generate novel images. Diffusion models can be used for various image generation tasks including image super-resolution, generation of images with perceptual metrics, conditional generation (e.g., generation based on text guidance), image inpainting, and image manipulation.

Types of diffusion models include Denoising Diffusion Probabilistic Models (DDPMs) and Denoising Diffusion Implicit Models (DDIMs). In DDPMs, the generative process includes reversing a stochastic Markov diffusion process. DDIMs, on the other hand, use a deterministic process so that the same input results in the same output. Diffusion models may also be characterized by whether the noise is added to the image itself, or to image features generated by an encoder (e.g., latent diffusion).

Diffusion models work by iteratively adding noise to the data during a forward process and then learning to recover the data by denoising the data during a reverse process. For example, during training, diffusion model 800 may take an original image 805 in a pixel space 810 as input and apply an image encoder 815 to convert original image 805 into original image features 820 in a latent space 825. Then, a forward diffusion process 830 gradually adds noise to the original image features 820 to obtain noisy features 835 (also in latent space 825) at various noise levels.

Next, a reverse diffusion process 840 (e.g., a U-Net ANN) gradually removes the noise from the noisy features 835 at the various noise levels to obtain the denoised image features 845 in latent space 825. In some examples, denoised image features 845 are compared to the original image features 820 at each of the various noise levels, and parameters of the reverse diffusion process 840 of the diffusion model are updated based on the comparison. Finally, an image decoder 850 decodes the denoised image features 845 to obtain an output image 855 in pixel space 810. In some cases, an output image 855 is created at each of the various noise levels. The output image 855 can be compared to the original image 805 to train the reverse diffusion process 840.

In some cases, image encoder 815 and image decoder 850 are pre-trained prior to training the reverse diffusion process 840. In some examples, image encoder 815 and image decoder 850 are trained jointly, or the image encoder 815 and image decoder 850 are fine-tuned jointly with the reverse diffusion process 840.

The reverse diffusion process 840 can also be guided based on a text prompt 860, or another guidance prompt, such as an image, a layout, a segmentation map, etc. The text prompt 860 can be encoded using a text encoder 865 (e.g., a multimodal encoder) to obtain guidance features 870 in guidance space 875. The guidance features 870 can be combined with the noisy features 835 at one or more layers of the reverse diffusion process 840 to ensure that the output image 855 includes content described by the text prompt 860. For example, guidance feature 870 can be combined with the noisy feature 835 using a cross-attention block within the reverse diffusion process 840.

In some examples, diffusion models are based on a neural network architecture known as a U-Net. The U-Net takes input features having an initial resolution and an initial number of channels, and processes the input features using an initial neural network layer (e.g., a convolutional network layer) to produce intermediate features. The intermediate features are then down-sampled using a down-sampling layer such that down-sampled features have a resolution less than the initial resolution and a number of channels greater than the initial number of channels.

This process is repeated multiple times, and then the process is reversed. For example, the down-sampled features are up-sampled using up-sampling process to obtain up-sampled features. The up-sampled features can be combined with intermediate features having a same resolution and number of channels via a skip connection. These inputs are processed using a final neural network layer to produce output features. In some cases, the output features have the same resolution as the initial resolution and the same number of channels as the initial number of channels.

In some cases, a U-Net takes additional input features to produce conditionally generated output. For example, the additional input features could include a vector representation of an input prompt. The additional input features can be combined with the intermediate features within the neural network at one or more layers. For example, a cross-attention module can be used to combine the additional input features and the intermediate features.

A diffusion process may also be modified based on conditional guidance. In some cases, a user provides a text prompt describing content to be included in a generated image. For example, a user may provide the prompt "a person playing with a cat". In some examples, guidance can be provided in a form other than text, such as via an image, a sketch, or a layout. The system converts the text prompt (or other guidance) into a conditional guidance vector or other multi-dimensional representation. For example, text may be converted into a vector or a series of vectors using a transformer model, or a multi-modal encoder. In some cases, the encoder for the conditional guidance is trained independently of the diffusion model.

A noise map is initialized that includes random noise. The noise map may be in a pixel space or a latent space. By initializing an image with random noise, different variations of an image including the content described by the conditional guidance can be generated. Then, the system generates an image based on the noise map and the conditional guidance vector.

A diffusion process can include both a forward diffusion process for adding noise to an image (or features in a latent space) and a reverse diffusion process for denoising the images (or features) to obtain a denoised image. The forward diffusion process can be represented as q $(x_t|x_{t-1})$, and the reverse diffusion process can be represented as p $(x_{t-1}|x_t)$. In some cases, the forward diffusion process is used during training to generate images with successively greater noise, and a neural network is trained to perform the reverse diffusion process (e.g., to successively remove the noise).

In an example forward process for a latent diffusion model, the model maps an observed variable $x_0$ (either in a pixel space or a latent space) intermediate variables $x_1, \ldots, x_T$ using a Markov chain. The Markov chain gradually adds Gaussian noise to the data to obtain the approximate posterior q $(x_{1:T}|x_0)$ as the latent variables are passed through a neural network such as a U-Net, where $x_1, \ldots, x_T$ have the same dimensionality as $x_0$.

The neural network may be trained to perform the reverse process. During the reverse diffusion process, the model begins with noisy data $x_T$, such as a noisy image and denoises the data to obtain the p $(x_{t-1}|x_t)$. At each step t−1, the reverse diffusion process takes $x_t$, such as the first intermediate image, and t as input. Here, t represents a step in the sequence of transitions associated with different noise levels, The reverse diffusion process outputs $x_{t-1}$, such as the second intermediate image iteratively until $x_T$ is reverted back to $x_0$, the original image. The reverse process can be represented as:

$$p_\theta(x_{t-1} \mid x_t) := N(x_{t-1}; \mu_\theta(x_t, t), \Sigma_\theta(x_t, t)). \tag{1}$$

The joint probability of a sequence of samples in the Markov chain can be written as a product of conditionals and the marginal probability:

$$x_T : p_\theta(x_{0:T}) := p(x_T)\prod_{t=1}^{T} p_\theta(x_{t-1} \mid x_t), \tag{2}$$

where p $(x_T)$=N $(x_T; 0,I)$ is the pure noise distribution as the reverse process takes the outcome of the forward process, a sample of pure noise, as input and $$\prod_{t=1}^{T} p_\theta(x_{t-1}|x_t)$$

represents a sequence of Gaussian transitions corresponding to a sequence of addition of Gaussian noise to the sample.

At interference time, observed data $x_0$ in a pixel space can be mapped into a latent space as input and a generated data $\tilde{x}$ is mapped back into the pixel space from the latent space as output. In some examples, $x_0$ represents an original input image with low image quality, latent variables $x_1, \ldots, x_T$ represent noisy images, and x represents the generated image with high image quality.

A diffusion model may be trained using both a forward and a reverse diffusion process. In one example, the user initializes an untrained model. Initialization can include defining the architecture of the model and establishing initial values for the model parameters. In some cases, the initialization can include defining hyper-parameters such as the number of layers, the resolution and channels of each layer block, the location of skip connections, and the like.

The system then adds noise to a training image using a forward diffusion process in N stages. In some cases, the forward diffusion process is a fixed process where Gaussian noise is successively added to an image. In latent diffusion models, the Gaussian noise may be successively added to features in a latent space.

At each stage n, starting with stage N, a reverse diffusion process is used to predict the image or image features at stage n−1. For example, the reverse diffusion process can predict the noise that was added by the forward diffusion process, and the predicted noise can be removed from the image to obtain the predicted image. In some cases, an original image is predicted at each stage of the training process.

The training system compares predicted image (or image features) at stage n−1 to an actual image (or image features), such as the image at stage n−1 or the original input image. For example, given observed data x, the diffusion model may be trained to minimize the variational upper bound of the negative log-likelihood $-\log p_\theta(x)$ of the training data. The training system then updates parameters of the model based on the comparison. For example, parameters of a U-Net may be updated using gradient descent. Time-dependent parameters of the Gaussian transitions can also be learned.

Diffusion model 800 is an example of, or includes aspects of, the corresponding element described with reference to FIG. 6. Text prompt 860 is an example of, or includes aspects of, the corresponding element described with reference to FIGS. 3, 6, and 7. Text encoder 865 is an example of, or includes aspects of, the corresponding element described with reference to FIGS. 5-7.

Image Generation

Figure 9:
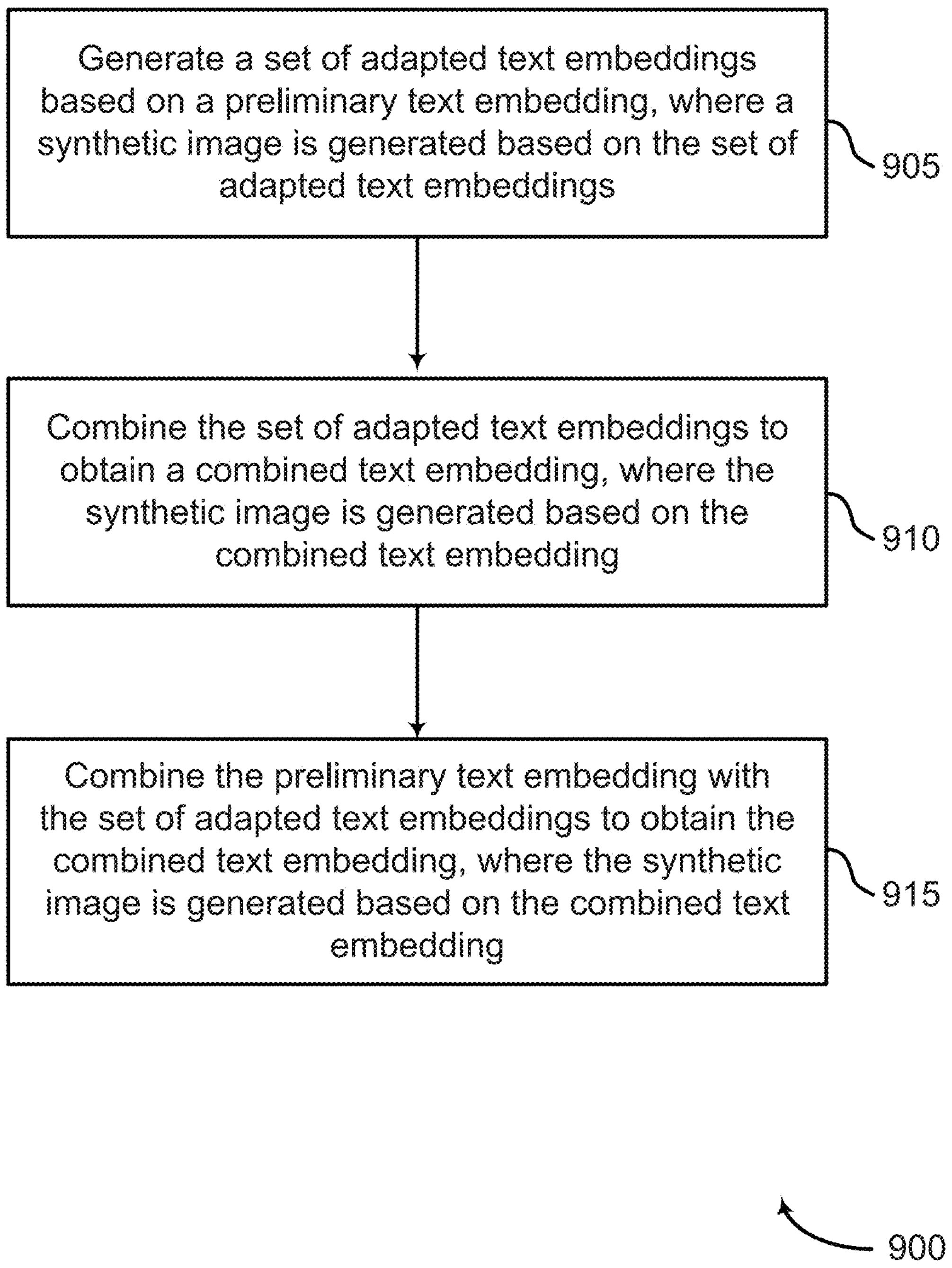
FIG. 9 shows an example of a method for generating a synthetic image using an adaptor network according to aspects of the present disclosure.

FIG. 9 shows an example of a method 900 for generating a synthetic image using an adaptor network according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 905, the system generates a set of adapted text embeddings based on a preliminary text embedding, where a synthetic image is generated based on the set of adapted text embeddings. In some cases, the operations of this step refer to, or may be performed by, an adaptor network as described with reference to FIGS. 5-7. For example, the preliminary text embedding is generated from a text encoder based on a text prompt. In some cases, a plurality of adaptors of an adaptor network respectively generates a plurality of adapted text embeddings based on the preliminary text embedding. In an example, each of the plurality of adapted text embeddings includes various content of the text prompt or preliminary text embedding.

At operation 910, the system combines the set of adapted text embeddings to obtain a combined text embedding, where the synthetic image is generated based on the combined text embedding. In some cases, the operations of this step refer to, or may be performed by, an adaptor network as described with reference to FIGS. 5-7. For example, the combined text embedding includes contents from each adapted text embedding of the set of adapted text embeddings. In some cases, the adaptor network performs pooling to generate the combined text embedding. Further details on pooling are described with reference to FIG. 7.

At operation 915, the system combines the preliminary text embedding with the set of adapted text embeddings to obtain the combined text embedding, where the synthetic image is generated based on the combined text embedding. In some cases, the operations of this step refer to, or may be performed by, an adaptor network as described with reference to FIGS. 5-7. In some cases, the combined text embedding includes contents from the preliminary text embedding and each of the set of adapted text embeddings. In some cases, the adaptor network performs pooling to generate the combined text embedding. Further details on pooling are described with reference to FIG. 7.

Training and Evaluation

Figure 10:
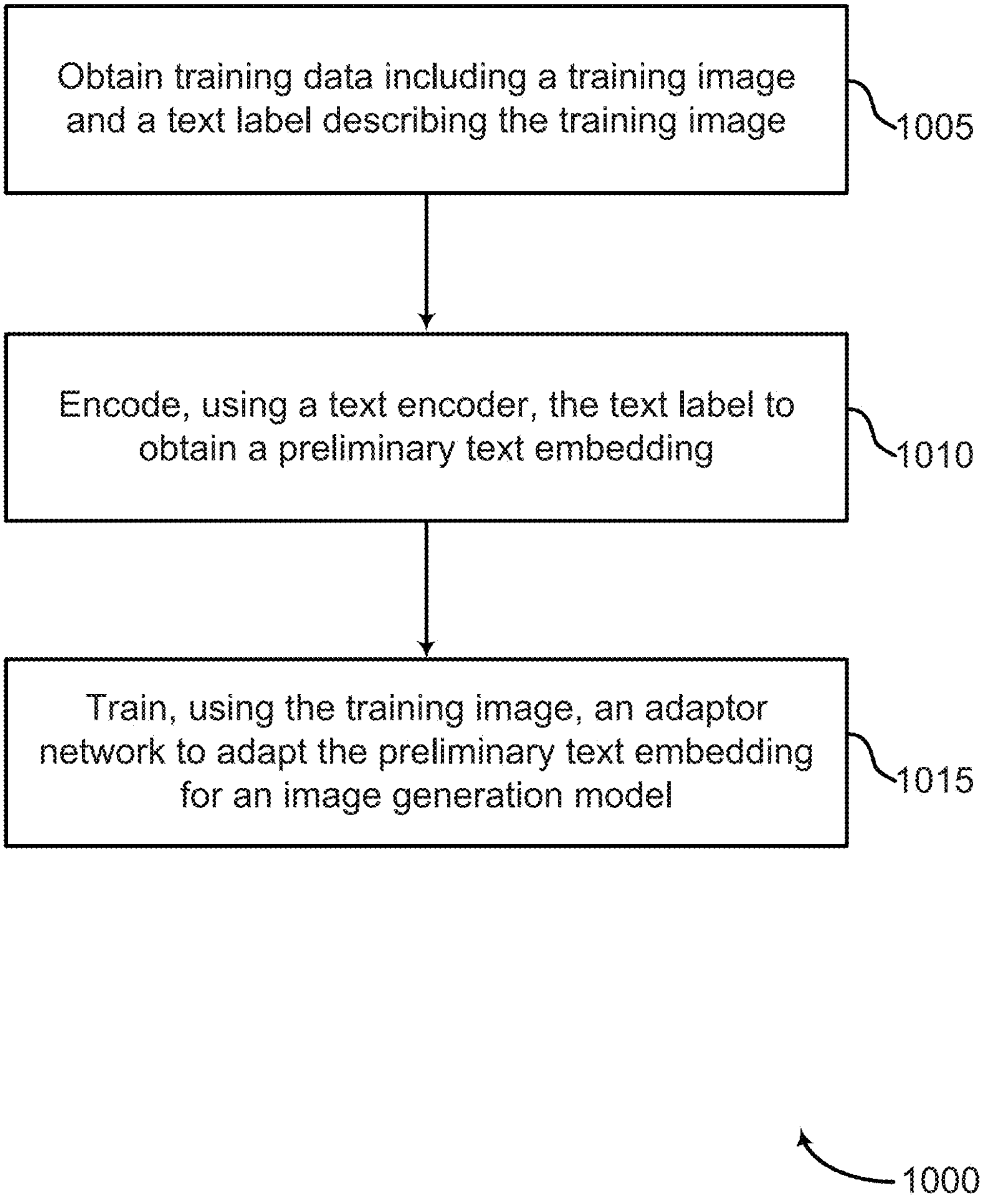
FIG. 10 shows an example of a method for training an image generation model according to aspects of the present disclosure.

In FIG. 10, a method, apparatus, non-transitory computer readable medium, and system for image processing are described. One or more aspects of the method, apparatus, non-transitory computer readable medium, and system include obtaining training data including a training image and a text label describing the training image; encoding, using a text encoder, the text label to obtain a preliminary text embedding; and training, using the training image, an adaptor network to adapt the preliminary text embedding for an image generation model.

Some examples of the method, apparatus, non-transitory computer readable medium, and system further include generating a synthetic image based on an output of the adaptor network. Some examples further include comparing the synthetic image and the training image. Some examples of the method, apparatus, non-transitory computer readable medium, and system further include computing a loss function based on the synthetic image and the training image.

Some examples of the method, apparatus, non-transitory computer readable medium, and system further include adding noise to the training image to obtain a noisy image. In some examples, the synthetic image is generated using a reverse diffusion process based on the noisy image.

Some examples of the method, apparatus, non-transitory computer readable medium, and system further include training a plurality of adaptor networks based on the image generation model. In some aspects, the text encoder is pre-trained independently of the adaptor network. In some aspects, the text encoder is pre-trained independently of the image generation model. In some aspects, the image generation model is trained with the adaptor network.

FIG. 10 shows an example of a method 1000 for training an image generation model according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 1005, the system obtains training data including a training image and a text label describing the training image. In some cases, the operations of this step refer to, or may be performed by, a machine learning model as described with reference to FIG. 5. In some cases, training data is stored in a database, for example, the database described with reference to FIG. 1. The text label provides information about the content, attributes, or context of the training image.

At operation 1010, the system encodes, using a text encoder, the text label to obtain a preliminary text embedding. In some cases, the operations of this step refer to, or may be performed by, a text encoder as described with reference to FIGS. 5-8. For example, the preliminary text embedding includes a numerical representation of the text label in a vector space. Preliminary text embedding converts the high-dimensional text data of the text label into a continuous vector space, where the semantic information and relationships between words or texts are captured in the vector space. Preliminary text embedding is an example of, or includes aspects of, the corresponding element described with reference to FIGS. 6-7.

At operation 1015, the system trains, using the training image, an adaptor network to adapt the preliminary text embedding for an image generation model. In some cases, the operations of this step refer to, or may be performed by, a training component as described with reference to FIG. 5. In some cases, for example, the system trains the adaptor network to generate an adapted text embedding based on the preliminary text embedding. An image generation model generates a synthetic image based on the adapted text embedding. In some cases, the training component computes a loss function based on the synthetic image and the training image. Further details on computing the loss function and training the system based on the loss function are described with reference to FIG. 8.

In some cases, for example, the adaptor network is trained based on an output of the image generation model. In some cases, for example, training the adaptor network includes generating, using an adaptor network, an adapted text embedding. In some cases, for example, training the adaptor network includes generating a synthetic image based on the adapted text embedding. In some cases, for example, training the adaptor network includes adapting text embeddings for the image generation model using the training image and the synthetic image.

Computing Device

Figure 11:
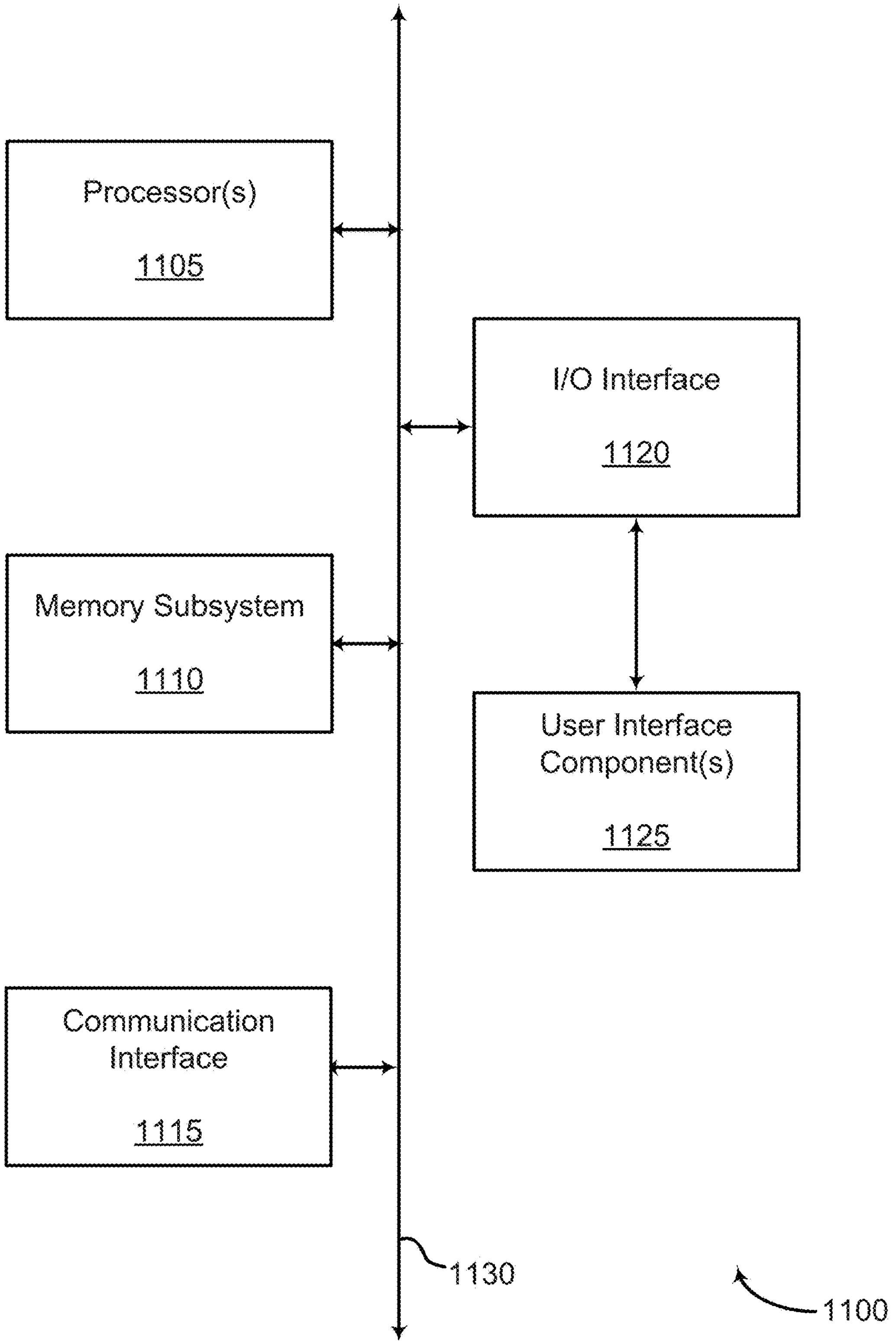
FIG. 11 shows an example of a computing device according to aspects of the present disclosure.

FIG. 11 shows an example of a computing device 1100 according to aspects of the present disclosure. The example shown includes computing device 1100, processor(s), memory subsystem 1110, communication interface 1115, I/O interface 1120, user interface component(s), and channel 1130.

In some embodiments, computing device 1100 is an example of, or includes aspects of, the image processing apparatus described with reference to FIGS. 1 and 5. In some embodiments, computing device 1100 includes one or more processors 1105 that can execute instructions stored in memory subsystem 1110 to obtain a text prompt; encode, using a text encoder, the text prompt to obtain a preliminary text embedding; generate, using an adaptor network, an adapted text embedding based on the preliminary text embedding, wherein the adaptor network is trained to adapt the preliminary text embedding for generating an input to an image generation model; and generate, using the image generation model, a synthetic image based on the adapted text embedding, wherein the synthetic image includes content described by the text prompt.

According to some embodiments, computing device 1100 includes one or more processors 1105. In some cases, a processor is an intelligent hardware device, (e.g., a general-purpose processing component, a digital signal processor (DSP), a central processing unit (CPU), a graphics processing unit (GPU), a microcontroller, an application-specific integrated circuit (ASIC), a field programmable gate array (FPGA), a programmable logic device, a discrete gate or transistor logic component, a discrete hardware component, or a combination thereof. In some cases, a processor is configured to operate a memory array using a memory controller. In other cases, a memory controller is integrated into a processor. In some cases, a processor is configured to execute computer-readable instructions stored in a memory to perform various functions. In some embodiments, a processor includes special-purpose components for modem processing, baseband processing, digital signal processing, or transmission processing. Processor(s) 1105 is an example of, or includes aspects of, the processor unit described with reference to FIG. 5.

According to some embodiments, memory subsystem 1110 includes one or more memory devices. Examples of a memory device include random access memory (RAM), read-only memory (ROM), or a hard disk. Examples of memory devices include solid-state memory and a hard disk drive. In some examples, memory is used to store computer-readable, computer-executable software including instructions that, when executed, cause a processor to perform various functions described herein. In some cases, the memory contains, among other things, a basic input/output system (BIOS) that controls basic hardware or software operations such as the interaction with peripheral components or devices. In some cases, a memory controller operates memory cells. For example, the memory controller can include a row decoder, column decoder, or both. In some cases, memory cells within a memory store information in the form of a logical state. Memory subsystem 1110 is an example of, or includes aspects of, the memory unit described with reference to FIG. 5.

According to some embodiments, communication interface 1115 operates at a boundary between communicating entities (such as computing device 1100, one or more user devices, a cloud, and one or more databases) and channel 1130 and can record and process communications. In some cases, communication interface 1115 is provided to enable a processing system coupled to a transceiver (e.g., a transmitter and/or a receiver). In some examples, the transceiver is configured to transmit (or send) and receive signals for a communications device via an antenna. In some cases, a bus is used in communication interface 1115.

According to some embodiments, I/O interface 1120 is controlled by an I/O controller to manage input and output signals for computing device 1100. In some cases, I/O interface 1120 manages peripherals not integrated into computing device 1100. In some cases, I/O interface 1120 represents a physical connection or port to an external peripheral. In some cases, the I/O controller uses an operating system such as iOS®, ANDROID®, MS-DOS®, MS-WINDOWS®, OS/2®, UNIX®, LINUX®, or other known operating system. In some cases, the I/O controller represents or interacts with a modem, a keyboard, a mouse, a touchscreen, or a similar device. In some cases, the I/O controller is implemented as a component of a processor. In some cases, a user interacts with a device via I/O interface 1120 or hardware components controlled by the I/O controller.

According to some embodiments, user interface component(s) 1125 enables a user to interact with computing device 1100. In some cases, user interface component(s) 1125 include an audio device, such as an external speaker system, an external display device such as a display screen, an input device (e.g., a remote-control device interfaced with a user interface directly or through the I/O controller), or a combination thereof.

The performance of apparatus, systems, and methods of the present disclosure have been evaluated, and results indicate embodiments of the present disclosure have obtained increased performance over existing technology (e.g., image generation models). Example experiments demonstrate that the image processing apparatus based on the present disclosure outperforms conventional image generation models. Details on the example use cases based on embodiments of the present disclosure are described with reference to FIG. 3.

The description and drawings described herein represent example configurations and do not represent all the implementations within the scope of the claims. For example, the operations and steps may be rearranged, combined or otherwise modified. Also, structures and devices may be represented in the form of block diagrams to represent the relationship between components and avoid obscuring the described concepts. Similar components or features may have the same name but may have different reference numbers corresponding to different figures.

Some modifications to the disclosure may be readily apparent to those skilled in the art, and the principles defined herein may be applied to other variations without departing from the scope of the disclosure. Thus, the disclosure is not limited to the examples and designs described herein, but is to be accorded the broadest scope consistent with the principles and novel features disclosed herein.

The described methods may be implemented or performed by devices that include a general-purpose processor, a digital signal processor (DSP), an application-specific integrated circuit (ASIC), a field programmable gate array (FPGA), or other programmable logic device, discrete gate or transistor logic, discrete hardware components, or any combination thereof. A general-purpose processor may be a microprocessor, a conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be implemented in hardware or software and may be executed by a processor, firmware, or any combination thereof. If implemented in software executed by a processor, the functions may be stored in the form of instructions or code on a computer-readable medium.

Computer-readable media includes both non-transitory computer storage media and communication media including any medium that facilitates transfer of code or data. A non-transitory storage medium may be any available medium that can be accessed by a computer. For example, non-transitory computer-readable media can comprise random access memory (RAM), read-only memory (ROM), electrically erasable programmable read-only memory (EEPROM), compact disk (CD) or other optical disk storage, magnetic disk storage, or any other non-transitory medium for carrying or storing data or code.

Also, connecting components may be properly termed computer-readable media. For example, if code or data is transmitted from a website, server, or other remote source using a coaxial cable, fiber optic cable, twisted pair, digital subscriber line (DSL), or wireless technology such as infrared, radio, or microwave signals, then the coaxial cable, fiber optic cable, twisted pair, DSL, or wireless technology are included in the definition of medium. Combinations of media are also included within the scope of computer-readable media.

In this disclosure and the following claims, the word “or” indicates an inclusive list such that, for example, the list of X, Y, or Z means X or Y or Z or XY or XZ or YZ or XYZ. Also the phrase “based on” is not used to represent a closed set of conditions. For example, a step that is described as “based on condition A” may be based on both condition A and condition B. In other words, the phrase “based on” shall be construed to mean “based at least in part on.” Also, the words “a” or “an” indicate “at least one.”

What is claimed is:

1. A method comprising:

obtaining a text prompt;

encoding, using a text encoder, the text prompt to obtain a preliminary text embedding;

generating, using an adaptor network, an adapted text embedding based on the preliminary text embedding, wherein the adaptor network is separate from the text encoder and receives the preliminary text embedding as an input from the text encoder, and wherein the adaptor network is trained based on an output of an image generation model; and generating, using the image generation model, a synthetic image based on the adapted text embedding, wherein the image generation model is separate from the adaptor network and receives the adapted text embedding as input from the adaptor network, and wherein the synthetic image includes content described by the text prompt.

2. The method of claim 1, further comprising:

generating, using a plurality of adaptor networks, a plurality of adapted text embeddings based on the preliminary text embedding, wherein the plurality of adaptor networks comprises a plurality of separate networks that each receives the preliminary text embedding as input from the text encoder, wherein the plurality of adapted text embeddings is generated in parallel, and wherein the synthetic image is generated based on the plurality of adapted text embeddings.

3. The method of claim 2, further comprising:

combining the plurality of adapted text embeddings to obtain a combined text embedding, wherein the synthetic image is generated based on the combined text embedding.

4. The method of claim 3, wherein:

the preliminary text embedding is combined with the plurality of adapted text embeddings to obtain the combined text embedding.

5. The method of claim 1, wherein:

the adaptor network is trained to adapt the preliminary text embedding for use as an input to the image generation model.

6. The method of claim 1, wherein generating the synthetic image comprises:

obtaining a noisy image; and performing a reverse diffusion process on the noisy image using the image generation model to obtain the synthetic image.

7. The method of claim 1, wherein generating the adapted text embedding comprises:

performing self-attention on the preliminary text embedding.

8. A method comprising:

obtaining training data including a training image and a text label describing the training image;

encoding, using a text encoder, the text label to obtain a preliminary text embedding;

generating, using an adaptor network, an adapted text embedding based on the preliminary text embedding, wherein the adaptor network is separate from the text encoder and receives the preliminary text embedding as an input from the text encoder;

generating, using an image generation model, an output based on the adapted text embedding, wherein the image generation model is separate from the adaptor network and receives the adapted text embedding as input from the adaptor network; and training, using the training image and the output of the image generation model, an adaptor network to adapt the preliminary text embedding for the image generation model.

9. The method of claim 8, wherein the training comprises: comparing the synthetic image and the training image.

10. The method of claim 9, wherein the training comprises:

computing a loss function based on the synthetic image and the training image.

11. The method of claim 9, wherein the training comprises:

adding noise to the training image to obtain a noisy image, wherein the synthetic image is generated using a reverse diffusion process based on the noisy image.

12. The method of claim 8, further comprising:

training a plurality of adaptor networks based on the image generation model.

13. The method of claim 8, wherein:

the text encoder is pre-trained independently of the adaptor network.

14. The method of claim 8, wherein:

the text encoder is pre-trained independently of the image generation model.

15. The method of claim 8, wherein:

the image generation model is trained at least in part based on the adaptor network.

16. An apparatus, comprising:

at least one processor;

at least one memory storing instructions and in electronic communication with the at least one processor;

a text encoder comprising parameters stored in the at least one memory and trained to encode a text prompt to obtain a preliminary text embedding; and an adaptor network comprising parameters stored in the at least one memory and trained to generate an adapted text embedding based on the preliminary text embedding and trained based on an output of an image generation model, wherein the adaptor network is separate from the text encoder and receives the preliminary text embedding as an input from the text encoder;

wherein the image generation model comprises parameters stored in the at least one memory and trained to generate a synthetic image based on the adapted text embedding, wherein the image generation model is separate from the adaptor network and receives the adapted text embedding as input from the adaptor network, and wherein the synthetic image includes content described by the text prompt.

17. The apparatus of claim 16, further comprising:

a plurality of adaptor networks comprising parameters stored in the at least one memory and trained to generate a plurality of adapted text embeddings based on the preliminary text embedding, wherein the plurality of adapted text embeddings is generated in parallel, and wherein the synthetic image is generated based on the plurality of adapted text embeddings.

18. The apparatus of claim 17, wherein:

the plurality of adaptor networks comprising an ensemble architecture.

19. The apparatus of claim 16, wherein:

the image generation model is a diffusion model.

20. The apparatus of claim 16, wherein:

the text encoder comprises an encoder of a text generation model.

* * * * *